(12) United States Patent
Hirschmann et al.

(10) Patent No.: US 7,052,744 B2
(45) Date of Patent: May 30, 2006

(54) LIQUID-CRYSTALLINE MIXTURES

(75) Inventors: Harald Hirschmann, Darmstadt (DE); Sven Schuepfer, Aschaffenburg (DE); Renate Graulich, Riedstadt (DE); Martina Weidner, Muenster (DE); Kevin Adlem, Bournemouth (GB); Mark John Goulding, Ringwood (GB); Patricia Saxton, Romsey (GB)

(73) Assignee: Merck Patent GmbH, Darmstadt (DE)

( * ) Notice: Subject to any disclaimer, the term of this patent is extended or adjusted under 35 U.S.C. 154(b) by 87 days.

(21) Appl. No.: 10/819,280

(22) Filed: Apr. 7, 2004

(65) Prior Publication Data

US 2004/0197494 A1    Oct. 7, 2004

(30) Foreign Application Priority Data

Apr. 7, 2003   (DE) ................................ 103 15 689

(51) Int. Cl.
*C09K 19/12* (2006.01)
*C09K 19/30* (2006.01)
*C09K 19/34* (2006.01)
*C09K 19/20* (2006.01)

(52) U.S. Cl. ............. 428/1.1; 252/299.61; 252/299.63; 252/299.66; 252/299.67

(58) Field of Classification Search ................. 428/1.1; 252/299.61, 299.63, 299.66, 299.67
See application file for complete search history.

(56) References Cited

U.S. PATENT DOCUMENTS

| | | | |
|---|---|---|---|
| 6,514,579 B1 * | 2/2003 | Hirschmann et al. | 428/1.1 |
| 6,531,194 B1 * | 3/2003 | Hirschmann | 428/1.1 |
| 6,544,602 B1 * | 4/2003 | Hirschmann et al. | 428/1.1 |
| 6,613,401 B1 * | 9/2003 | Hirschmann et al. | 428/1.1 |
| 6,649,229 B1 * | 11/2003 | Hirschmann | 428/1.1 |
| 6,753,045 B1 * | 6/2004 | Suermann | 428/1.1 |
| 6,790,488 B1 * | 9/2004 | Nakajima et al. | 428/1.1 |
| 6,808,763 B1 * | 10/2004 | Hirschmann et al. | 428/1.1 |

FOREIGN PATENT DOCUMENTS

WO    WO01/12751    *    2/2001

* cited by examiner

*Primary Examiner*—Shean C. Wu
(74) *Attorney, Agent, or Firm*—Millen, White, Zelano & Branigan, P.C.

(57) ABSTRACT

Nematic liquid-crystal mixtures comprising one or more compounds of the formula I

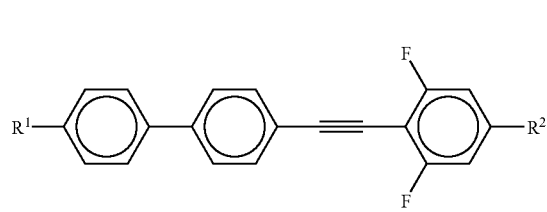

in which $R^1$ and $R^2$ are as defined herein, are suitable for use in TN and STN liquid-crystal displays.

33 Claims, No Drawings

LIQUID-CRYSTALLINE MIXTURES

The present invention relates to liquid-crystalline mixtures and to the use thereof, in particular in twisted nematic (TN) and supertwisted nematic (STN) liquid-crystal displays having very short response times, good steepnesses of the electro-optical characteristic line and good angle dependencies of the contrast.

TN displays are known, for example from M. Schadt and W. Helfrich, Appl. Phys. Lett., 18, 127 (1971). STN displays are known, for example from EP 0 131 216 B1; DE 34 23 993 A1; EP 0 098 070 A2; M. Schadt and F. Leenhouts, 17th Freiburg Congress on Liquid Crystals (8.–10.04.87); K. Kawasaki et al., SID 87 Digest 391 (20.6); M. Schadt and F. Leenhouts, SID 87 Digest 372 (20.1); K. Katoh et al., Japanese Journal of Applied Physics, Vol. 26, No. 11, L 1784–L 1786 (1987); F. Leenhouts et al., Appl. Phys. Lett. 50 (21), 1468 (1987); H. A. van Sprang and H. G. Koopman, J. Appl. Phys. 62 (5), 1734 (1987); T. J. Scheffer and J. Nehring, Appl. Phys. Lett. 45 (10), 1021 (1984), M. Schadt and F. Leenhouts, Appl. Phys. Lett. 50 (5), 236 (1987) and E. P. Raynes, Mol. Cryst. Liq. Cryst. Letters Vol. 4 (1), pp. 1–8 (1986). The term STN here covers any relatively highly twisted display element having a twist angle with a value of between 160° and 360°, such as, for example, the display elements according to Waters et al. (C. M. Waters et al., Proc. Soc. Inf. Disp. (New York) (1985) (3rd Intern. Display Conference, Kobe, Japan), STN-LCDs (DE-A 35 03 259), SBE-LCDs (T. J. Scheffer and J. Nehring, Appl. Phys. Left. 45 (1984) 1021), OMI-LCDs (M. Schadt and F. Leenhouts, Appl. Phys. Lett. 50 (1987), 236, DST-LCDs (EP-A 0 246 842) or BW-STN-LCDs (K. Kawasaki et al., SID 87 Digest 391 (20.6)).

Compared with standard TN displays, STN displays in particular are distinguished by significantly better steepnesses of the electro-optical characteristic line and consequently by better contrast values and by significantly lower angle dependence of the contrast.

Of particular interest are TN and STN displays having very short response times, in particular even at low temperatures. In order to achieve short response times, the rotational viscosities $\gamma_1$ of the liquid-crystal mixtures have hitherto been optimised using mostly monotropic additives having relatively high vapour pressure. However, the response times achieved were not adequate for every application.

In order to achieve a steep electro-optical characteristic line in the displays according to the invention, the liquid-crystal mixtures should have relatively large values for the ratio between the elastic constants $K_{33}/K_{11}$ and relatively small values for $\Delta\epsilon/\epsilon_\perp$, where $\Delta\epsilon$ is the dielectric anisotropy and $\epsilon_\perp$ is the dielectric constant perpendicular to the longitudinal molecular axis.

In addition to optimisation of the contrast and response times, further important requirements are made of mixtures of this type:
1. broad d/p window
2. high long-term chemical stability
3. high electrical resistance
4. low frequency and temperature dependence of the threshold voltage.

The parameter combinations achieved are still far from adequate, in particular for high-multiplex STN displays (with a multiplex rate in the region of about 1/400), but also for medium- and low-multiplex STN displays (with multiplex rates in the region of about 1/64 and 1/16 respectively), and TN displays. This is partly attributable to the fact that the various requirements are affected in opposite manners by material parameters.

Thus, there continues to be a great demand for liquid-crystalline mixtures, in particular for TN and STN displays, having very short response times at the same time as a large working-temperature range, high electro-optical characteristic-line steepness, good angle dependence of the contrast and low threshold voltage which meet the above-mentioned requirements. The present invention thus has an object of providing TN and STN displays which do not have the above-mentioned disadvantages or only do so to a lesser extent and at the same time have short response times, in particular at low temperatures, and very good steepnesses of the electrooptical characteristic line.

Upon further study of the specification and appended claims, further objects and advantages of this invention will become apparent to those skilled in the art.

Surprisingly, it has now been found that this object is achieved by the provision of nematic liquid-crystal mixtures which comprise one or more compounds of the formula I

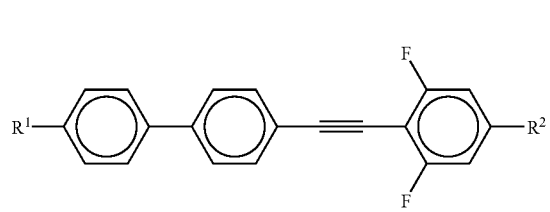

in which at least one of the two radicals $R^1$ and $R^2$ is an alkenyl radical having up to 15 carbon atoms which is unsubstituted, monosubstituted by CN or $CF_3$ or at least monosubstituted by halogen, and the other may additionally be an alkyl radical having up to 15 carbon atoms which is unsubstituted, monosubstituted by CN or $CF_3$ or at least monosubstituted by halogen, where, in addition, one or more $CH_2$ groups in these alkenyl and alkyl radicals may be replaced by —O—, —S—, —C≡C—, —OC—O— or —O—CO— in such a way that O atoms are not linked directly to one another.

The use of the compounds of the formula I in the mixtures according to the invention for TN and STN displays results in high steepness of the electro-optical characteristic line, for example, V90N10=1.03 to 1.12 (Voltages V90 and V10 determined with squarewave addressing at frequency of 80 Hz)

low temperature dependence of the threshold voltage, for example, 1–8 mV/deg C for the temperature range from 0 to 40° C. (voltages determined with squarewave addressing at frequency of 80 Hz).

very fast response times, for example, 100 to 800 ms for the total of ton+toff (assuming a multiplex ratio of 1/64 and a bias ratio of 1/9 at 20° C.; response times of, for example, 1000 sec to 15000 sec at −20° C.).

Data for steepness, temperature dependence of the threshold voltage and response time depends on the liquid crystal mixture composition and the cell parameters (twist angle, pretilt angle, retardation of the cell, pitch of the Lc mixture, polyimide type, polyimide thickness etc.) For the evaluation of the different parameters, a STN cell with 240 deg twist, cell retardation d*Δn (cellgap times birefringence) of 0.85 µm and d/p value (Cellgap divided by pitch value) of 0.53

μm was used. The PI-type is Nissan SE-3140, the PI thickness is about 40–50 nm, the pretilt angle is in the range of 4–7 deg. All experimental data was determined with standard electro-optical measurement equipment "DMS" by Autronic-Melchers, Karlsruhe (Germany).

The compounds of the formula I significantly shorten, in particular, the response times of TN and STN mixtures while simultaneously increasing the steepness of the electro-optical characteristic line and reducing the temperature dependence of the threshold voltage.

The mixtures according to the invention are furthermore distinguished by the following properties:
low viscosity, for example, 15–60 mm$^2$/sec at 20° C.
long shelf lives in the display at low temperatures, for example, a minimum of 1000 hours at −20° a C., minimum of 500 hours at −30° C. and minimum of 250 hours at −40° C.

The invention furthermore relates to a liquid-crystal display, in particular a TN or STN liquid-crystal display, having two outer plates, which, together with a frame, form a cell,
a nematic liquid-crystal mixture of positive dielectric anisotropy located in the cell,
electrode layers with alignment layers on the insides of the outer plates,
a tilt angle between the longitudinal axis of the molecules at the surface of the outer plates and the outer plates of 0° to 30°, and
a twist angle of the liquid-crystal mixture in the cell from alignment layer to alignment layer with a value of 22.5° to 600°,
which is characterised in that it contains a liquid-crystal mixture which comprises at least one compound of the formula I.

In a particularly preferred embodiment, the mixture according to the invention is a nematic liquid-crystal mixture which comprises:
a) 20 to 99% by weight of a liquid-crystalline component A consisting of one or more compounds having a dielectric anisotropy of greater than +1.5;
b) 1 to 80% by weight of a liquid-crystalline component B consisting of one or more compounds having a dielectric anisotropy of −1.5 to +1.5; and
c) if desired, an optically active component C in such an amount that the ratio between the layer thickness (separation of the outer plates) and the natural pitch of the chiral nematic liquid-crystal mixture is about 0.2 to 1.3, and which is characterised in that component A comprises at least one compound of the formula I.

The invention also relates to corresponding liquid-crystal mixtures for use in TN and STN displays, in particular in medium- and low-multiplexed STN displays.

The formula I here preferably covers compounds of the formulae Ia to Ic

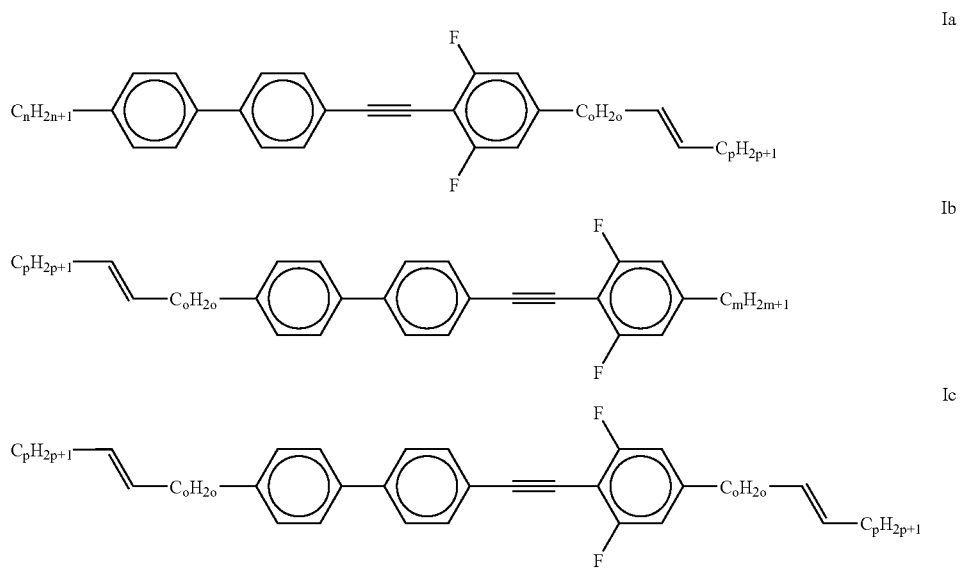

in which n and m are from 1 to 10, preferably from 1 to 5, and o and p are each, independently of one another, identical or different and are from 0 to 10, preferably from 0 to 5, where the sum o+p is preferably ≦13, especially ≦7.

Particular preference is given to mixtures according to the invention which comprise at least one compound of the formula Ia.

In the formulae Ia to Ic, the alkenyl radical is particularly preferably 1E-alkenyl or 3E-alkenyl, each having from 2 to 7 carbon atoms.

The proportion of the compounds of the formula I in the mixtures is from 1 to 40% by weight, preferably from 3 to 30% by weight and in particular from 5 to 20% by weight.

The compounds of the formula I having a dielectric anisotropy of >1.5 are to be assigned to component A defined above.

The use of compounds of the formula I in the liquid-crystal mixtures according to the invention results in particularly low values of the rotational viscosity and in TN and STN displays having high steepness of the electro-optical characteristic line and fast response times, in particular at low temperatures.

Besides one or more compounds of the formula I, component A preferably comprises one or more cyano compounds of the formulae IIa to IIk IIa
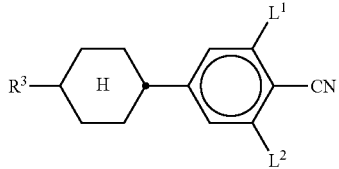

IIb
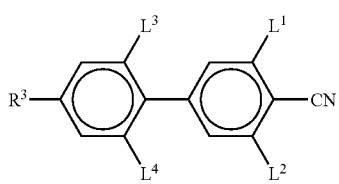

IIc
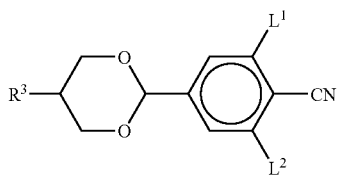

IId
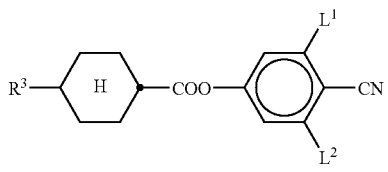

IIe
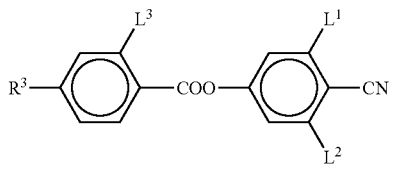

IIf
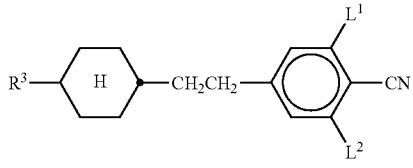

IIg
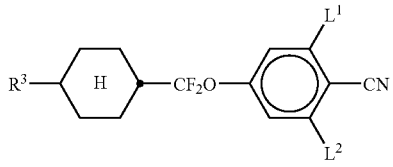

-continued

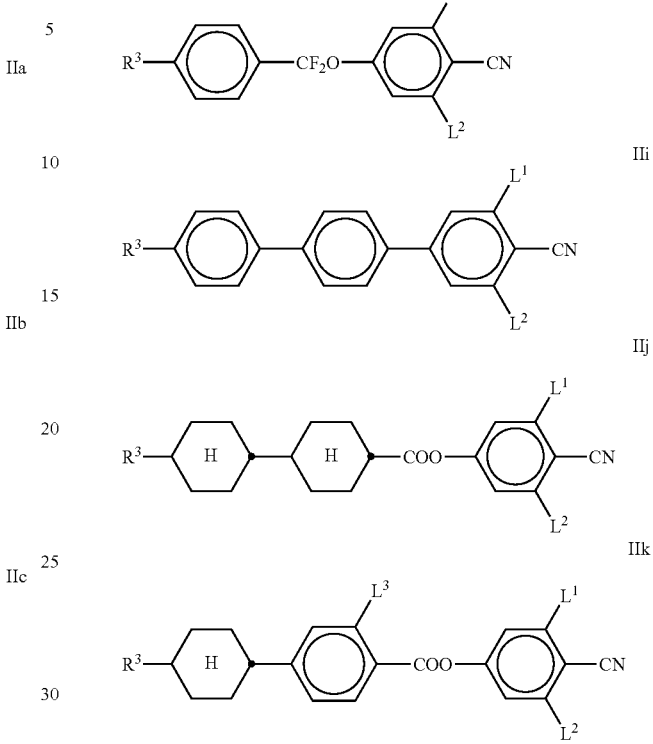

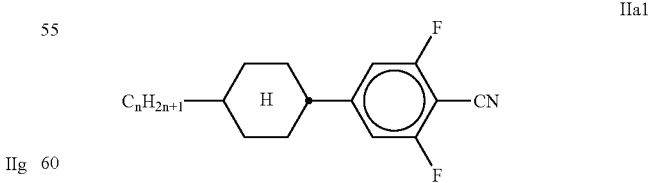

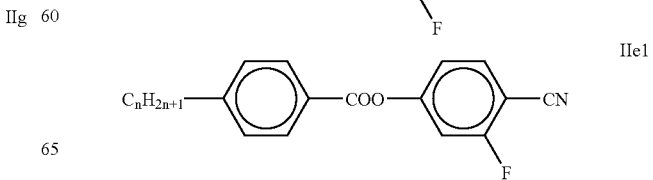

in which $R^3$ is an alkyl radical having up to 15 carbon atoms which is unsubstituted, monosubstituted by CN or $CF_3$ or at least monosubstituted by halogen, where, in addition, one or more $CH_2$ groups in this radical may be replaced by —O—, —S—, —C≡C—, —CH=CH—, —OC—O— or —O—CO— in such a way that O atoms are not linked directly to one another, and $L^1$ to $L^4$ are each, independently of one another, H or F. $R^3$ in these compounds is particularly preferably alkyl, alkenyl, alkoxy or alkenyloxy having up to 7 carbon atoms.

Particular preference is given here to the cyano compounds of the formula II in which $L^1$ and $L^2$ are F and $R^3$ is an alkyl group having up to 7 carbon atoms (n=1 to 7) (IIa1), of the formula IIe in which $L^1$ and $L^3$ are H, $L^2$ is F and $R^3$ is an alkyl group having up to 7 carbon atoms (n=1 to 7) (IIe1) and of the formula IIe in which $L^1$ and $L^2$ are F, $L^3$ is H and $R^3$ is an alkenyl group having up to 7 carbon atoms (o=1 to 3 and p=1 to 4) (IIe2).

-continued
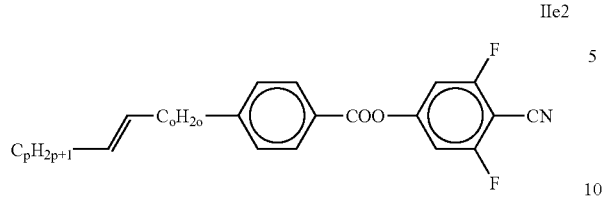
IIe2
Besides one or more compounds of the formula 1, component A preferably comprises one or more 3,4,5-trifluorophenyl compounds of the formulae IIIa to IIIj
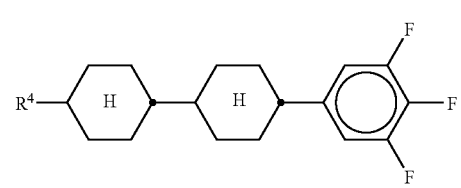
IIIa
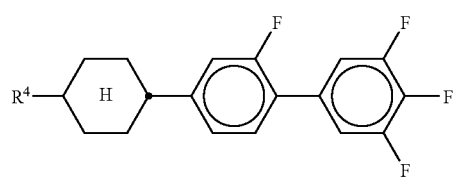
IIIb
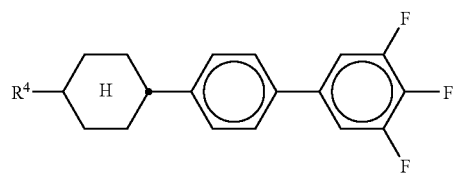
IIIc
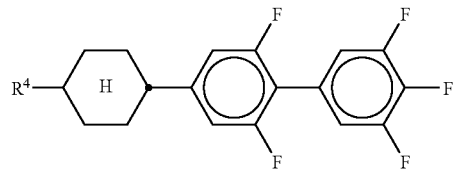
IIId
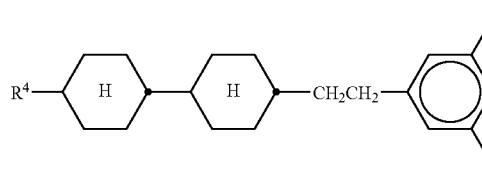
IIIe
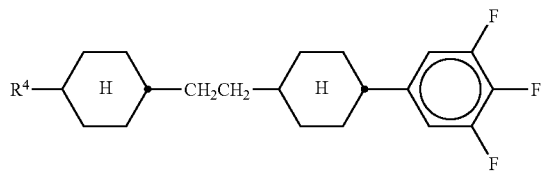
IIIf
-continued
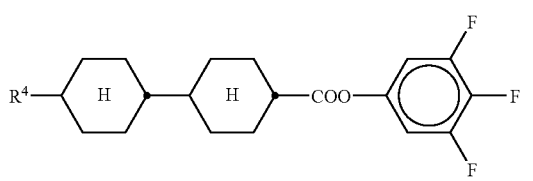
IIIg
IIIh
IIIi
IIIj
and optionally one or more compounds containing a polar end group, of the formulae IVa to IVm
IVa
IVb
IVc
IVd -continued

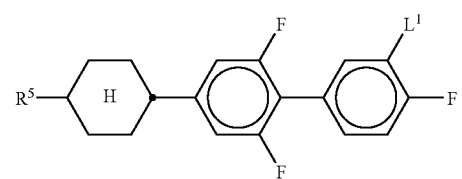
IVe

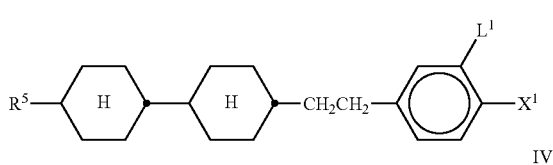
IVf

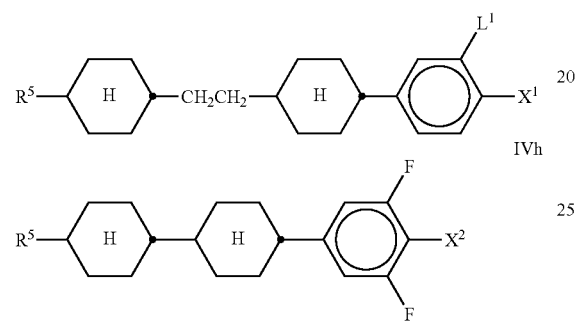
IVg

IVh

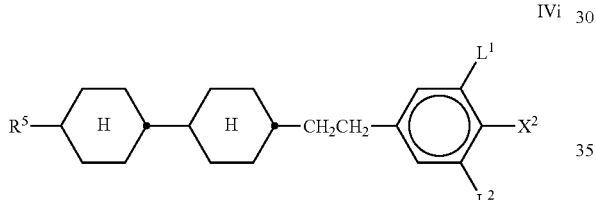
IVi

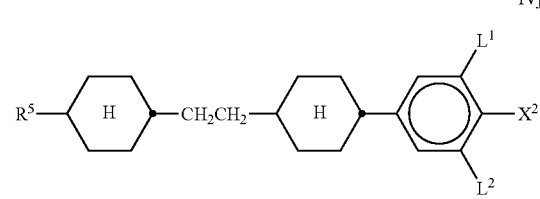
IVj

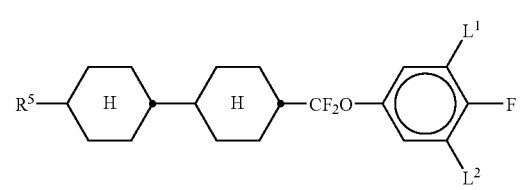
IVk

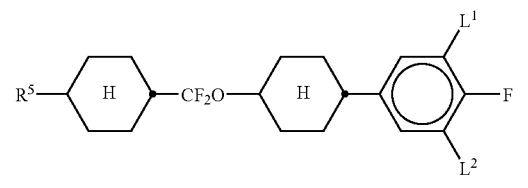
IVm in which $R^4$ and $R^5$ are each, independently, an alkyl radical having up to 15 carbon atoms which is unsubstituted, monosubstituted by CN or $CF_3$ or at least monosubstituted by halogen, where, in addition, one or more $CH_2$ groups in these radicals may be replaced by —O—, —S—, —C≡C—, —CH=CH—, —OC—O— or —O—CO— in such a way that O atoms are not linked directly to one another, and $L^1$ and $L^2$ are each, independently of one another, identical or different and are H or F. $R^4$ and $R^5$ in these compounds are particularly preferably alkyl, alkenyl, alkoxy or alkenyloxy having up to 7 carbon atoms. $X^1$ in these compounds is preferably F or Cl, particularly preferably F, and $X^2$ in these compounds is preferably $CF_3$, $OCF_3$ or $OCHF_2$.

Particular preference is given here to the 3,4,5-trifluorophenyl compounds of the formulae IIIa, IIIg and IIIi in which $R^4$ is an alkyl group having up to 7 carbon atoms (IIIa1, IIIg1 and IIIi1).

In a preferred embodiment, the liquid-crystalline mixture according to the invention comprises at least one compound of the formula IIIa1, IIIg1 and/or IIIi1

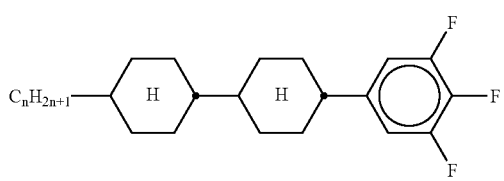
IIIa1

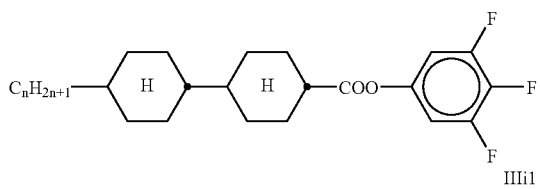
IIIg1

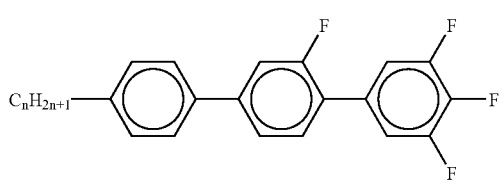
IIIi1 in which n=1 to 7.

Particular preference is furthermore given to compounds containing a polar end group, of the formula IVc in which $L^1$ is F and $R^5$ is an alkyl or alkenyl group having up to 7 carbon atoms (IVc1) and of the formula IVh in which $R^5$ is an alkyl group having up to 7 carbon atoms and $X^2$ is $CF_3$, $OCF_3$ or $OCHF_2$ (IVh1).

The individual compounds of the formulae I, IIa to IIk, IIIa to IIIj and IVa to IVm and their sub-formulae or alternatively other compounds which can be used in the mixtures according to the invention are either known or can be prepared analogously to known compounds.

The compounds of the formula I have low viscosities, in particular low rotational viscosities, and low values for the ratio between the elastic constants $K_{33}/K_{11}$, and therefore result in short response times in the displays according to the invention, while the presence of compounds of the formulae II, III and IV of high dielectric anisotropy, in particular in increased concentrations, results in a reduction in the threshold voltage.

Preferred liquid-crystal mixtures comprise component A in a proportion of 20 to 99%, particularly preferably 30 to 90% and in particular 40 to 80%. The compounds of component A preferably have a dielectric anisotropy $\Delta\epsilon$ of $\geq +3$, particularly preferably $\Delta\epsilon \geq +8$ and in particular $\Delta\epsilon \geq +12$.

Further preferred mixtures comprise one or more compounds of the formula I, in particular one or more compounds of the formula Ia, one or more, in particular one or two, compounds of the formula IIa, one or more, in particular two, three or four, compounds of the formula IIe, and one or more compounds of the formula IVc.

Preferred liquid-crystal mixtures comprise component B in a proportion of 1 to 80%, particularly preferably 10 to 70% and in particular 20 to 60%. The component B compounds are distinguished, in particular, by low values for the rotational viscosity $\gamma_1$.

Component B preferably comprises one or more compounds selected from the group consisting of the bicyclic compounds of the following formulae V1 to V9

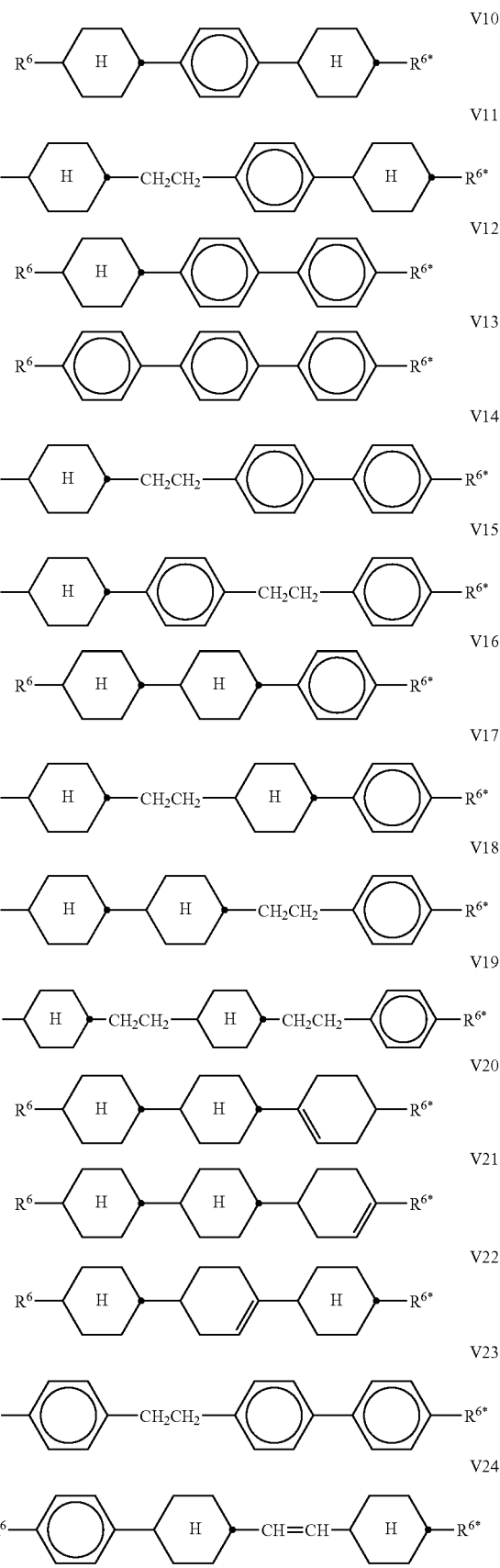

and/or one or more compounds selected from the group consisting of the tricyclic compounds of the formulae V10 to V29

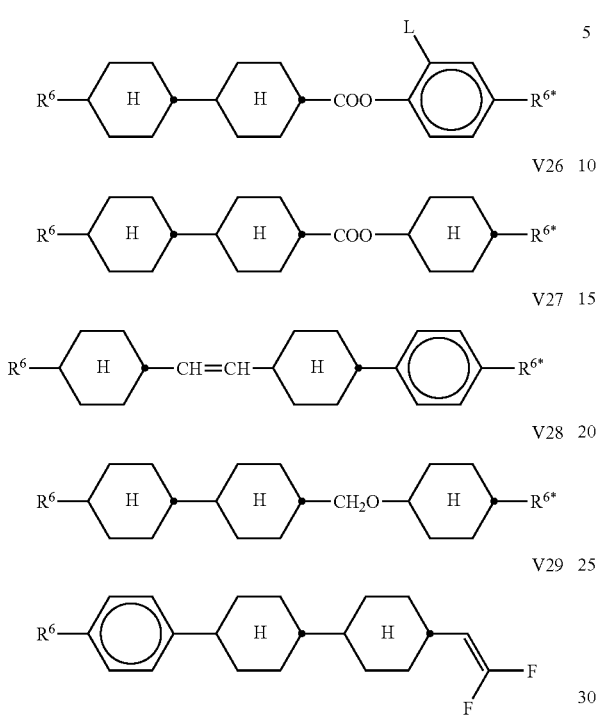

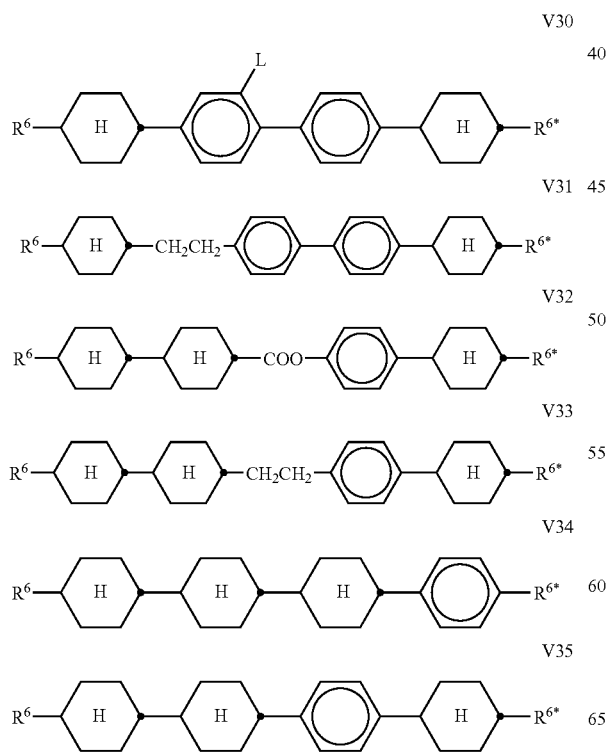

and/or one or more compounds selected from the group consisting of the tetracyclic compounds of the formulae V30 to V36

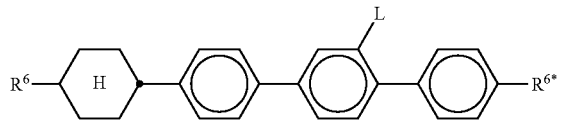

in which $R^6$ and $R^{6*}$, independently of one another, are identical or different and are each an alkyl radical having up to 15 carbon atoms which is unsubstituted, monosubstituted by CN or $CF_3$ or at least monosubstituted by halogen, where, in addition, one or more $CH_2$ groups in these radicals may be replaced by —O—, —S—, —C≡C—, —CH=CH—, —OC—O— or —O—CO— in such a way that O atoms are not linked directly to one another, L is H or F, and the 1,4-phenylene rings may each, independently of one another, also be monosubstituted or polysubstituted by fluorine.

$R^6$ and $R^{6*}$ in the compounds of the formulae V1 to V36 are preferably straight-chain alkyl or alkoxy having from 1 to 12 carbon atoms or alkenyl or alkenyloxy having from 2 to 12 carbon atoms.

Preferred liquid-crystal mixtures comprise one, two, three or four compounds of the formula V6, one, two, three or four compounds of the formula V1 6 and/or one, two, three or four compounds of the formula V27. In the formula V6, $R^6$ is preferably straight-chain alkyl, and $R^{6*}$ is preferably straight-chain alkenyl. In the formula V16, $R^6$ is preferably straight-chain alkenyl and $R^{6*}$ is preferably straight-chain alkyl. In the formula V27, $R^6$ is preferably straight-chain alkenyl and $R^{6*}$ is preferably straight-chain alkyl or alkoxy.

Preference is furthermore given to mixtures according to the invention which comprise at least one compound of the formula V32. Particular preference is given to mixtures which comprise two, three or more homologues of the formula V32. In the formula V32, $R^6$ and $R^{6*}$ are preferably straight-chain alkyl.

If desired, the liquid-crystalline mixtures comprise an optically active component C in such an amount that the ratio between the layer thickness (separation of the outer plates) and the natural pitch of the chiral nematic liquid-crystal mixture is greater than 0.2. A multiplicity of chiral dopants, some of which are commercially available, such as, for example, cholesteryl nonanoate (CN), S-811, S-1011, S-2011 from Merck KGaA, Darmstadt, and CB15 (BDH, Poole, UK), is available as component C to the person skilled in the art. The choice of dopants is not crucial per se.

The proportion of the compounds of component C is preferably from 0 to 10%, particularly preferably from 0 to 5% and in particular from 0 to 3%.

Further preferred embodiments relate to liquid-crystal mixtures according to the invention which:
additionally comprise one or more, particularly preferably one, two or three, heterocyclic compounds of the formula VIa and/or VIb

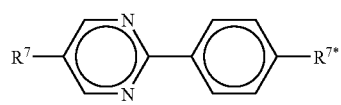

-continued

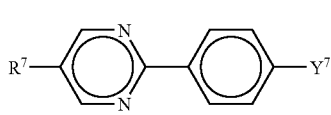
VIb in which R⁷ and R⁷*, independently of one another, are alkyl having from 1 to 7 carbon atoms, and Y⁷ is F or Cl.

The proportion of the compounds VIa and/or VIb is preferably from 0 to 35% and particularly preferably from 0 to 20%. and/or additionally comprise one or more, particularly preferably one, two or three, tolan compounds of the formulae VIIa to VIIg

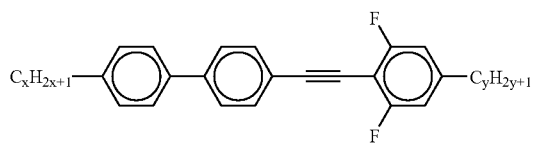
VIIa

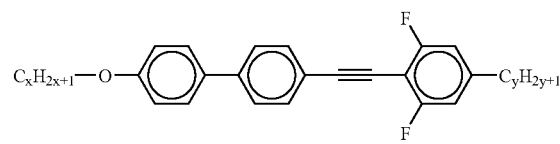
VIIb

VIIc

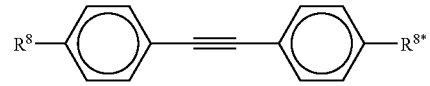
VIIe

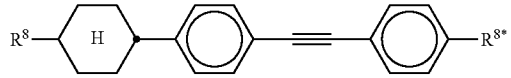
VIId

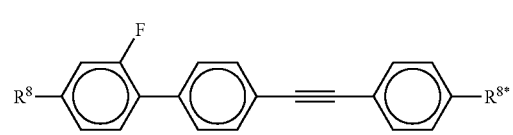
VIIg

VIIf in which $R^8$ and $R^{8*}$, independently of one another, are identical or different and are each an alkyl radical having up to 15 carbon atoms which is unsubstituted, monosubstituted by CN or $CF_3$ or at least monosubstituted by halogen, where, in addition, one or more $CH_2$ groups in these radicals may be replaced by —O—, —S—, —C≡C—, —CH=CH—, —OC—O— or —O—CO— in such a way that O atoms are not linked directly to one another, x and y are each from 1 to 12, where x+y<15 and z is from 1 to 5.

Particularly preferred liquid-crystal mixtures comprise one, two, three or four compounds of the formula VIIe. In the formula VIIe, $R^8$ is preferably straight-chain alkoxy having from 1 to 12 carbon atoms and $R^{8*}$ is preferably straight-chain alkyl having from 1 to 12 carbon atoms.

The proportion of the compounds VIIa to VIIg is preferably 0 to 30% and particularly preferably 0 to 20%.

The term "alkenyl" in the definition of $R^1$, $R^2$, $R^3$, $R^4$, $R^5$, $R^6$, $R^{7*}$, $R^8$ and $R^{8*}$ covers straight-chain and branched alkenyl groups, but preferably the straight-chain groups. Particularly preferred alkenyl groups are $C_2$–$C_7$-1E-alkenyl, $C_4$–$C_7$-3E-alkenyl, $C_5$–$C_7$-4-alkenyl, $C_6$–$C_7$-5-alkenyl and $C_7$-6-alkenyl, in particular $C_2$–$C_7$-1E-alkenyl, $C_4$–$C_7$-3E-alkenyl and $C_5$–$C_7$-4-alkenyl.

Examples of preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl and 6-heptenyl. However, groups having up to 5 carbon atoms are particularly preferred.

In a further preferred embodiment, the mixture comprises at least one compound of the formulae VIIIa to VIIIe, particularly preferably at least one compound of the formula VIIIa and/or VIIIb

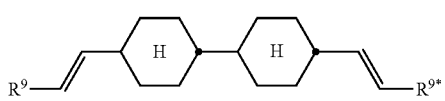
VIIIa

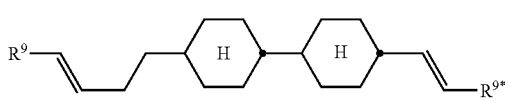
VIIIb

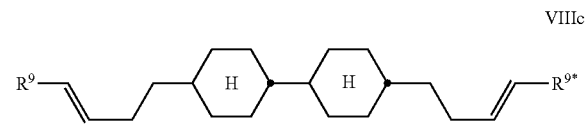
VIIIc

-continued

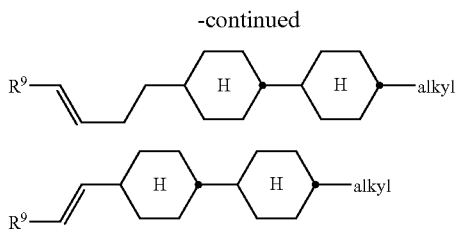

VIIId

VIIIe in which $R^9$ and $R^{9*}$ are each, independently of one another, identical or different and are H, $CH_3$, $C_2H_5$ or n-$C_3H_7$, and "alkyl" is a straight-chain alkyl group having from 1 to 7 carbon atoms, preferably n-propyl or n-pentyl.

The mixtures according to the invention are distinguished, in particular on use in TN and STN displays of high layer thicknesses, by very low total response times ($t_{tot}=t_{on}+t_{off}$), for example, 120–800 ms at 20° C. as discussed above.

The liquid-crystal mixtures used in the TN and STN cells according to the invention are preferably dielectrically positive, with $\Delta\epsilon \geq 1$. Particular preference is given to liquid-crystal mixtures with $\Delta\epsilon \geq 3$ and in particular with $\Delta\epsilon \geq 5$.

The liquid-crystal mixtures according to the invention have favourable values for the threshold voltage $V_{10/0/20}$ and for the rotational viscosity $\gamma_1$. If the value for the optical path difference d·Δn is pre-specified, the value for the layer thickness d is determined by the optical anisotropy Δn. In particular at relatively high values for d·Δn, the use of liquid-crystal mixtures according to the invention having a relatively high value for the optical anisotropy is generally preferred, since the value for d can then be selected to be relatively small, which results in more favourable values for the response times. However, liquid-crystal displays according to the invention which contain liquid-crystal mixtures according to the invention with smaller values for Δn are also characterised by advantageous values for the response times.

The liquid-crystal mixtures according to the invention are furthermore characterised by advantageous values for the steepness of the electro-optical characteristic line, and can be operated with high multiplex rates. In addition, the liquid-crystal mixtures according to the invention have high stability and favourable values for the electrical resistance and the frequency dependence of the threshold voltage. The liquid-crystal displays according to the invention have a large working-temperature range and good angle dependence of the contrast.

The construction of the liquid-crystal display elements according to the invention from polarisers, electrode base plates and electrodes having a surface treatment such that the preferential alignment (director) of the liquid-crystal molecules in each case adjacent thereto is usually twisted by a value of 160° to 720° from one electrode to the other corresponds to the usual structure for display elements of this type. The term "usual structure" here is broadly drawn and also covers all derivatives and modifications of the TN and STN cell, in particular also matrix display elements and display elements containing additional magnets.

The surface tilt angle at the two outer plates may be identical or different. Identical tilt angles are preferred. Preferred TN displays have pre-tilt angles between the longitudinal axis of the molecules at the surface of the outer plates and the outer plates of 0° to 7°, preferably 0.01° to 5° and particularly preferably 0.1° to 2°. In the STN displays, the pre-tilt angle is 1° to 30°, preferably 1° to 12° and particularly preferably 3° to 10°.

The twist angle of the TN mixture in the cell has a value of 22.5° to 170°, preferably 45° to 130° and particularly preferably 80° to 115°. The twist angle of the STN mixture in the cell from alignment layer to alignment layer has a value of 100° to 600°, preferably 170° to 300° and particularly preferably 180° to 270°.

The liquid-crystal mixtures according to the invention are prepared in a manner which is conventional per se. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

The dielectrics may also comprise further additives which are known to the person skilled in the art and are described in the literature. For example, 0 to 15% of pleochroic dyes can be added.

The entire disclosure of all applications, patents and publications, cited above and below, and of corresponding German Application No. 10315689.5, filed Apr. 7, 2003, is hereby incorporated by reference.

In the present application and in the examples below, the structures of the liquid-crystal compounds are indicated by means of acronyms, the transformation into chemical formulae taking place in accordance with Tables A and B below. All radicals $C_nH_{2n+1}$ and $C_mH_{2m+1}$ are straight-chain alkyl radicals having n and m carbon atoms respectively. The alkenyl radicals have the trans-configuration. The coding in Table B is self-evident. In Table A, only the acronym for the parent structure is indicated. In individual cases, the acronym for the parent structure is followed, separated by a dash, by the code indicated in the table below for the substituents $R^1$, $R^2$, $L^1$, $L_2$ and $L^3$.

| Code for $R^1$, $R^2$, $L^1$, $L^2$, $L^3$ | $R^1$ | $R^2$ | $L^1$ | $L^2$ | $L^3$ |
|---|---|---|---|---|---|
| nm | $C_nH_{2n+1}$ | $C_mH_{2m+1}$ | H | H | H |
| nO.m | $OC_nH_{2n+1}$ | $C_mH_{2m+1}$ | H | H | H |
| nOm | $C_nH_{2n+1}$ | $OC_mH_{2m+1}$ | H | H | H |
| n | $C_nH_{2n+1}$ | CN | H | H | H |
| nN.F | $C_nH_{2n+1}$ | CN | H | H | F |
| nN.F.F | $C_nH_{2n+1}$ | CN | H | F | F |
| nF | $C_nH_{2n+1}$ | F | H | H | H |
| nOF | $OC_nH_{2n+1}$ | F | H | H | H |
| nF.F | $C_nH_{2n+1}$ | F | H | H | F |
| nmF | $C_nH_{2n+1}$ | $C_mH_{2m+1}$ | F | H | H |
| nOCF$_3$ | $C_nH_{2n+1}$ | OCF$_3$ | H | H | H |
| n-Vm | $C_nH_{2n+1}$ | —CH=CH—$C_mH_{2m+1}$ | H | H | H |
| nV-Vm | $C_nH_{2n+1}$—CH=CH— | —CH=CH—$C_mH_{2m+1}$ | H | H | H |

The TN and STN displays preferably contain liquid-crystalline mixtures composed of one or more compounds from Tables A and B.

TABLE A
(L¹, L², L³ = H or F)
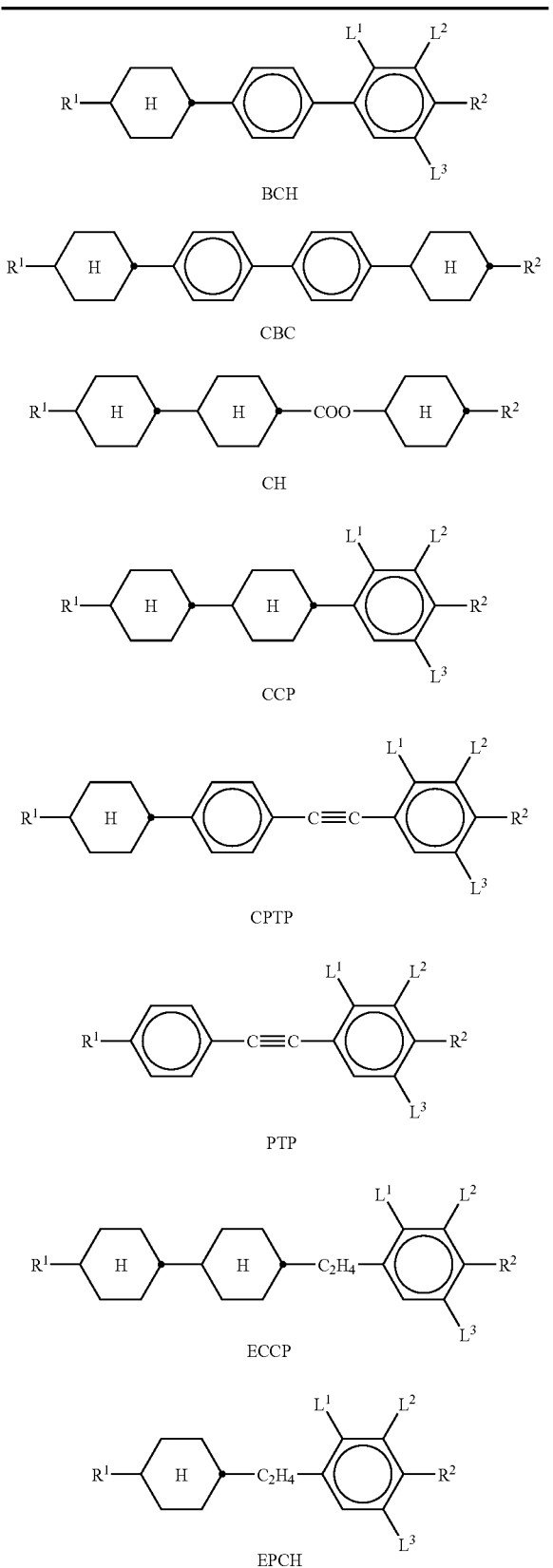
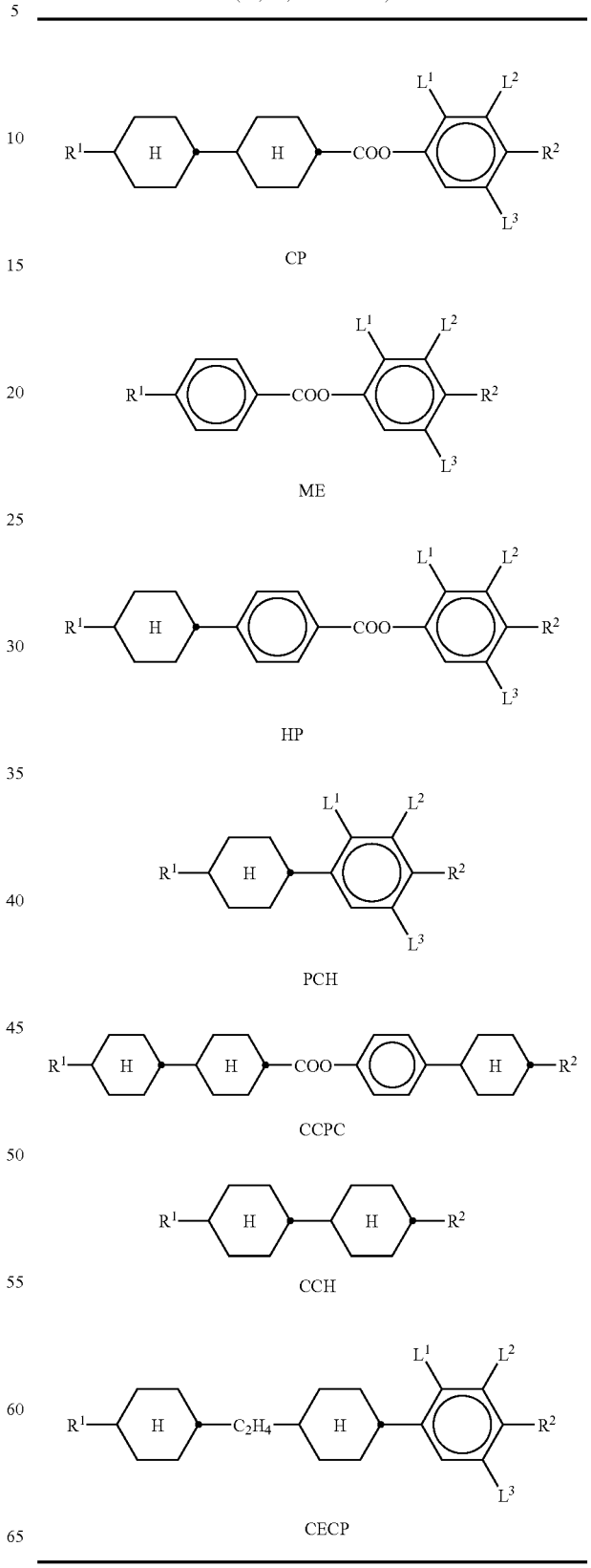

TABLE B
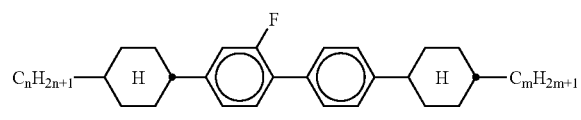
CBC-nmF
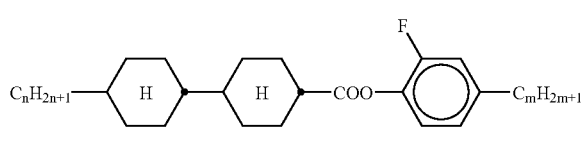
CP-nmF
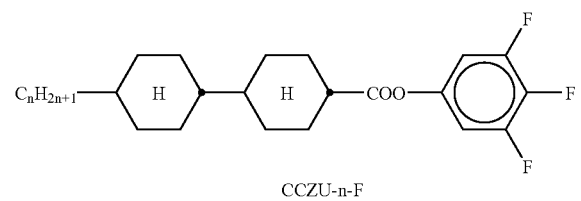
CCZU-n-F
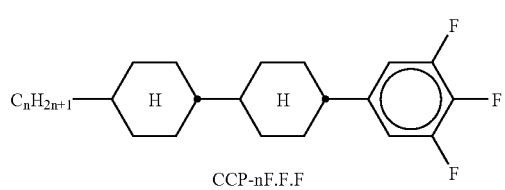
CCP-nF.F.F
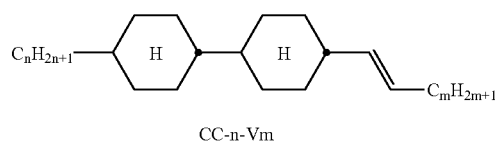
CC-n-Vm
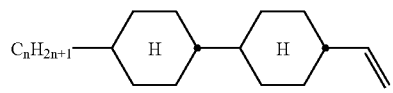
CC-n-V
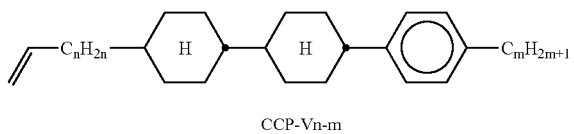
CCP-Vn-m
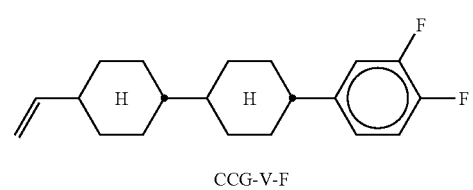
CCG-V-F
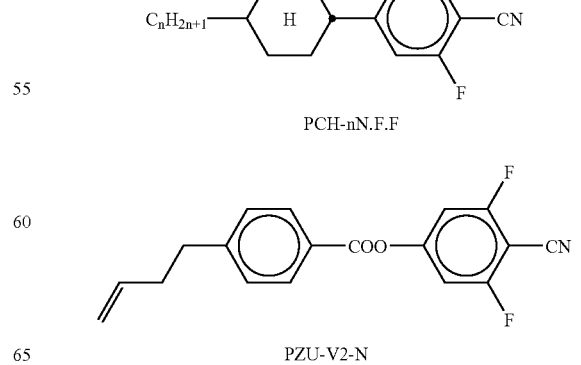
CCP-V-m
TABLE B-continued
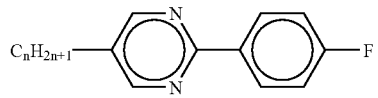
PYP-nF
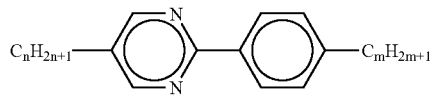
PYP-nm
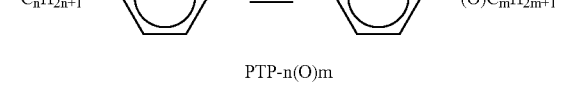
PTP-n(O)m
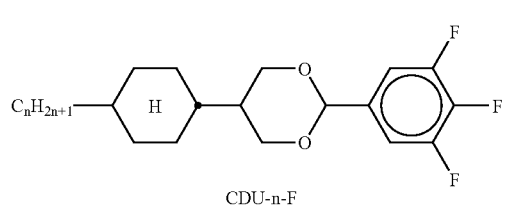
CPTP-n(O)m
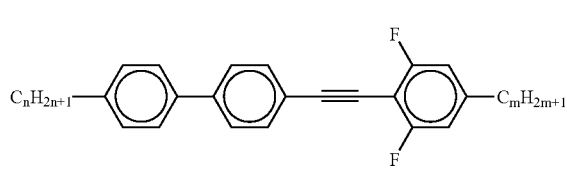
CDU-n-F
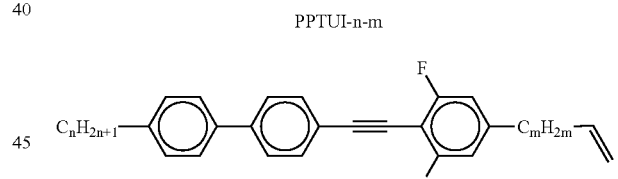
PPTUI-n-m
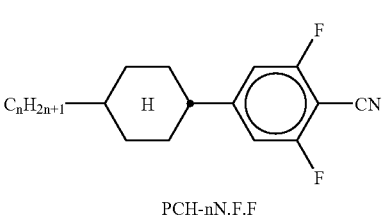
PPTUI-n-mV
PCH-nN.F.F
PZU-V2-N TABLE B-continued
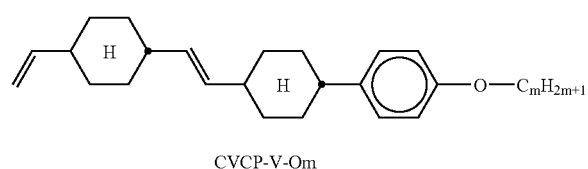
CVCP-V-Om
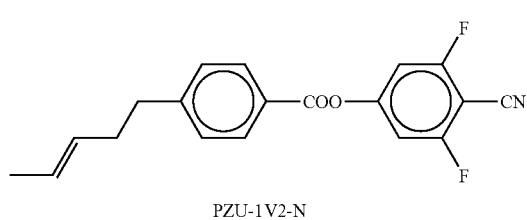
PZU-1V2-N
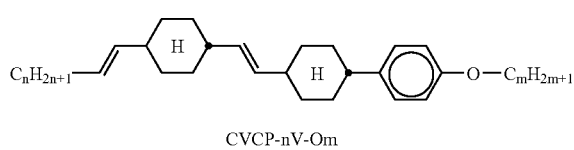
CVCP-nV-Om
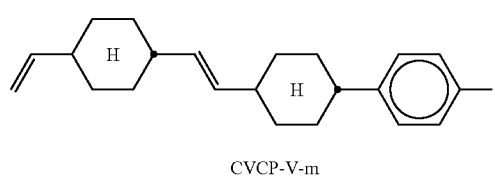
CVCP-V-m
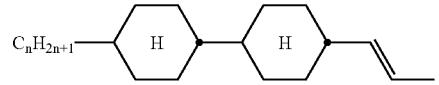
CC-n-V1
TABLE B-continued
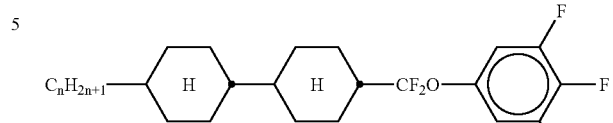
CCQU-n-F
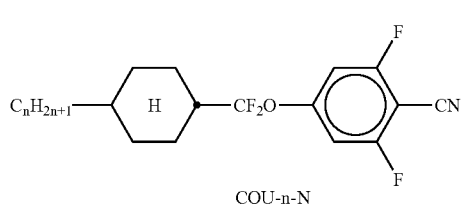
CQU-n-N
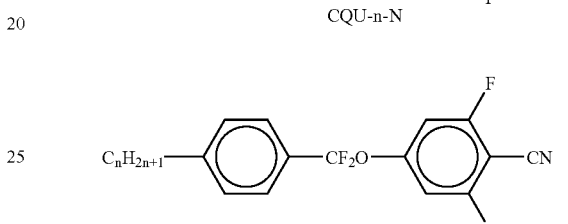
PQU-n-N
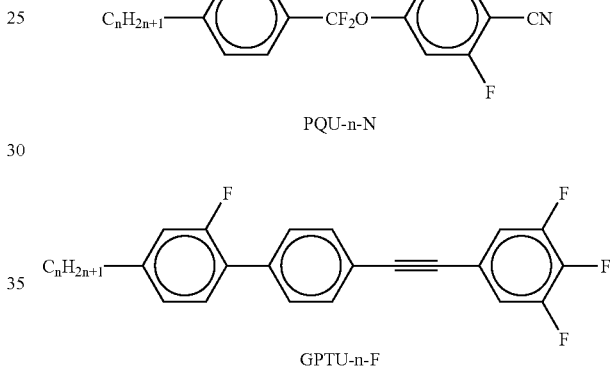
GPTU-n-F
TABLE C
Table C shows possible dopants which are preferably added to the mixtures according to the invention.
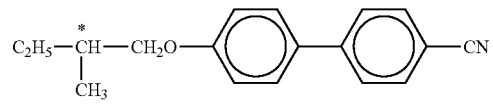
C15
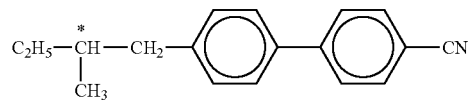
CB15
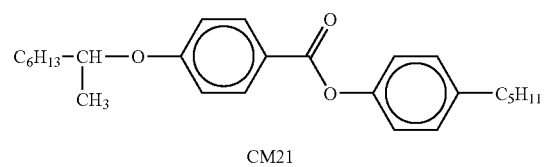
CM21
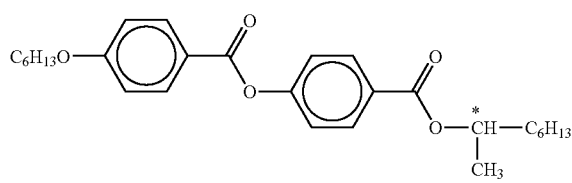
R/S-811

TABLE C-continued

Table C shows possible dopants which are preferably added to the
mixtures according to the invention.

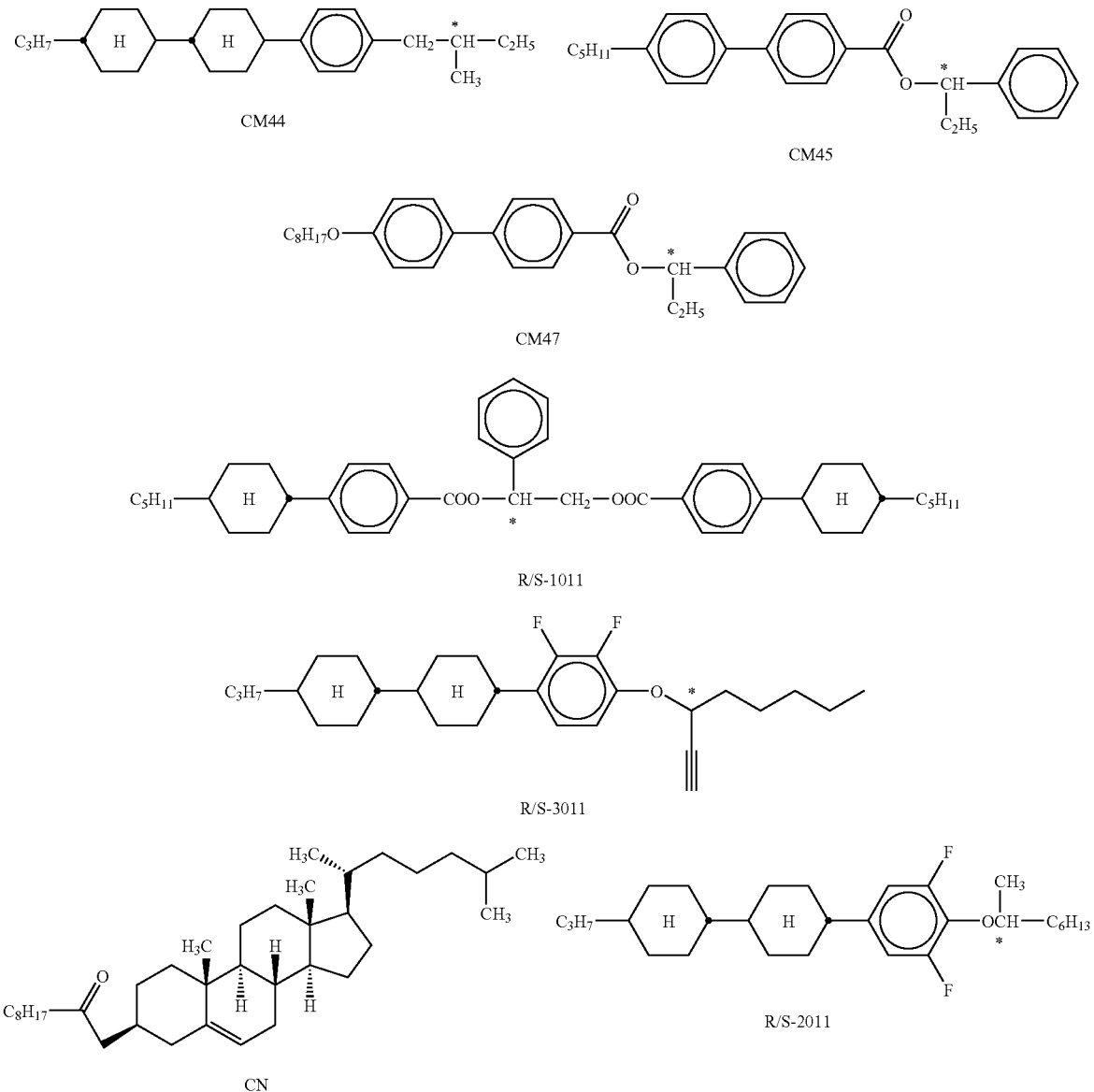

The following examples are intended to illustrate the invention without representing a limitation. The following abbreviations are used:

| | |
|---|---|
| cl.p. | clearing point (nematic-isotropic phase-transition temperature), |
| S-N | smectic-nematic phase-transition temperature, |
| visc. | flow viscosity ($mm^2/s$, unless stated otherwise, at 20° C.), |
| $\Delta n$ | optical anisotropy (589 nm, 20° C.), |
| $\Delta\epsilon$ | dielectric anisotropy (1 kHz, 20° C.), |
| steep | characteristic-line steepness = $V_{90}/V_{10}$, |
| $V_{10}$ | threshold voltage = characteristic voltage at a relative contrast of 10%, |
| $V_{90}$ | characteristic voltage at a relative contrast of 90%, |
| $t_{ave}$ | $\frac{t_{on} + t_{off}}{2}$ (average response time), |
| $t_{on}$ | time from switching on until 90% of the maximum contrast is reached, |
| $t_{off}$ | time from switching off until 10% of the maximum contrast is reached, |
| mux | multiplex rate. |

Above and below, all temperatures are given in ° C. The percentages are percent by weight. All values relate to 20° C., unless stated otherwise. The displays are addressed, unless stated otherwise, without multiplexing. The twist is 240°, unless stated otherwise. The response times were determined at a multiplex ratio of 1/64 and a bias of 1/9.

EXAMPLES

Comparative Example 1

| PCH-3N.F.F | 10.0% | Clearing point [°C.]: | 93.5 |
| ME2N.F | 7.0% | Δn [589 nm; 20° C.]: | 0.1395 |
| ME3N.F | 7.0% | d · Δn [μm]: | 0.85 |
| ME4N.F | 10.0% | Twist [°]: | 240 |
| ME5N.F | 7.5% | $V_{10}$ [V]: | 1.24 |
| COG-V-F | 14.0% | $V_{50}$ [V]: | 1.30 |
| CC-3-V1 | 3.0% | $V_{90}$ [V]: | 1.34 |
| CC-5-V | 3.0% | $V_{90/10}$: | 1.077 |
| CCP-V-1 | 13.0% | | |
| CCP-V2-1 | 8.0% | $t_{on} + t_{off}$ [ms] | 510 |
| CCPC-33 | 4.0% | | |
| CCPC-34 | 3.0% | Δε [1 kHz, 20° C.] | +25.1 |
| CCPC-35 | 3.0% | | |
| PPTUI-3-2 | 7.5% | | |

Example 1

| PCH-3N.F.F | 10.0% | Clearing point [° C.]: | 93.5 |
| ME2N.F | 7.0% | Δn [589 nm; 20° C.]: | 0.1394 |
| ME3N.F | 7.0% | d · Δn [μm]: | 0.85 |
| ME4N.F | 10.0% | Twist [°]: | 240 |
| ME5N.F | 7.5% | $V_{10}$ [V]: | 1.24 |
| CCG-V-F | 14.0% | $V_{50}$ [V]: | 1.26 |
| CC-3-V1 | 3.0% | $V_{90}$ [V]: | 1.29 |
| CC-5-V | 3.0% | $V_{90/10}$: | 1.045 |
| CCP-V-1 | 13.0% | | |
| CCP-V2-1 | 8.0% | $t_{on} + t_{off}$ [ms] | 550 |
| CCPC-33 | 4.0% | | |
| CCPC-34 | 3.0% | | |
| CCPC-35 | 3.0% | | |
| PPTUI-3-2V | 7.5% | | |

Comparative Example 2

| PCH-3N.F.F | 10.0% | Clearing point [° C.]: | 88.0 |
| ME2N.F | 2.0% | Δn [589 nm; 20° C.]: | 0.1618 |
| ME3N.F | 2.0% | d · Δn [μm]: | 0.85 |
| ME4N.F | 10.0% | Twist [°]: | 240 |
| CC-5-V | 10.0% | $V_{10}$ [V]: | 1.67 |
| CCG-V-F | 18.0% | $V_{50}$ [V]: | 1.74 |
| CCP-V-1 | 8.0% | $V_{90}$ [V]: | 1.79 |
| CCP-V2-1 | 5.0% | $V_{90/10}$: | 1.070 |
| CVCP-V-1 | 4.0% | | |
| CVCP-V-O1 | 4.0% | $t_{on} + t_{off}$ [ms] | 220 |
| CVCP-1V-O1 | 2.0% | | |
| PTP-1O2 | 5.0% | Δε [1 kHz, 20° C.] | +12.2 |
| PTP-2O1 | 3.0% | | |
| PTP-3O1 | 3.0% | | |
| PPTUI-3-2 | 14.0% | | |

Example 2

| PCH-3N.F.F | 10.0% | Clearing point [° C.]: | 88.5 |
| ME2N.F | 2.0% | Δn [589 nm; 20° C.]: | 0.1603 |
| ME3N.F | 2.0% | d · Δn [μm]: | 0.85 |
| ME4N.F | 10.0% | Twist [°]: | 240 |
| CC-5-V | 10.0% | $V_{10}$ [V]: | 1.70 |
| CCG-V-F | 18.0% | $V_{50}$ [V]: | 1.74 |
| CCP-V-1 | 8.0% | $V_{90}$ [V]: | 1.78 |
| CCP-V2-1 | 5.0% | $V_{90/10}$: | 1.043 |
| CVCP-V-1 | 4.0% | | |
| CVCP-V-O1 | 4.0% | $t_{on} + t_{off}$ [ms] | 250 |
| CVCP-1V-O1 | 2.0% | | |
| PTP-1O2 | 5.0% | Δε [1 kHz, 20° C.] | +11.6 |
| PTP-2O1 | 3.0% | | |
| PTP-3O1 | 3.0% | | |
| PPTUI-3-2V | 14.0% | | |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A nematic liquid-crystal mixture comprising at least two liquid crystalline compounds, wherein said mixture contains one or more compounds of formula I

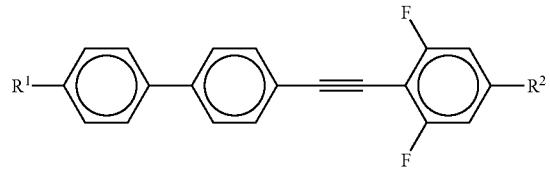

wherein $R^1$ is alkyl having up to 15 carbon atoms which is unsubstituted, monosubstituted by CN or $CF_3$ or at least monosubstituted by halogen, and wherein optionally one or more $CH_2$ groups in $R^1$ are each replaced by —O—, —S—, —C≡C—, —OC—O— or —O—CO— in such a way that O atoms are not linked directly to one another, and $R^2$ is alkenyl having up to 15 carbon atoms which is unsubstituted, or monosubstituted by CN or $CF_3$, or at least monosubstituted by halogen, and wherein optionally one or more $CH_2$ groups in $R^2$ are each replaced by —O—, —S—, —C≡C—, —OC—O— or —O—CO— in such a way that O atoms are not linked directly to one another.

2. A nematic liquid-crystal mixture according to claim 1, further comprising, in addition to said one or more compounds of formula I, at least one compound of formula Ia

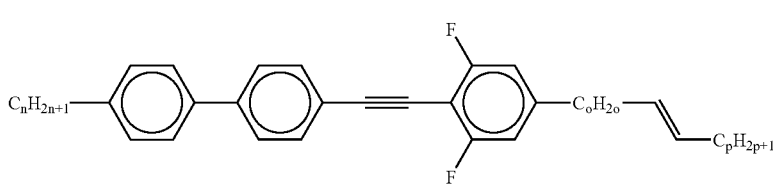

wherein
n is 1 to 10, and o and p are each, independently of one another, 0 to 10.

3. A nematic liquid-crystal mixture according to claim 1, further comprising at least one compound of formula IIa1

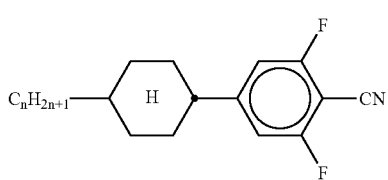

wherein n is 1 to 7.

4. A nematic liquid-crystal mixture according to claim 2, further comprising at least one compound of formula IIa1

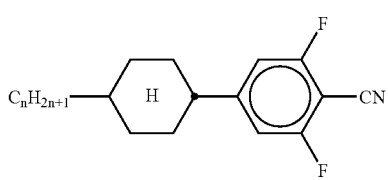

wherein n is 1 to 7.

5. A nematic liquid-crystal mixture according to claim 1, further comprising at least one compound of formula IIe1 and/or formula IIe2

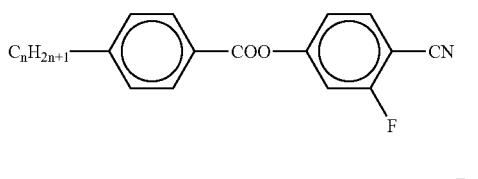

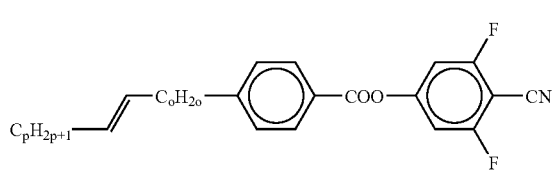

wherein n is 1 to 7, o is 1 to 3 and p is 1 to 4.

6. A nematic liquid-crystal mixture according to claim 1, further comprising at least one compound of formula IIIa1, formula IIIg1 and/or formula IIIi1

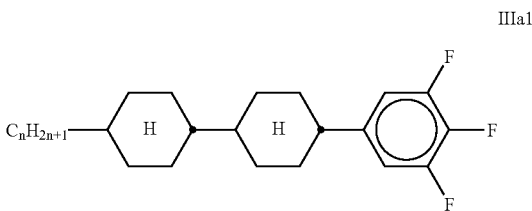

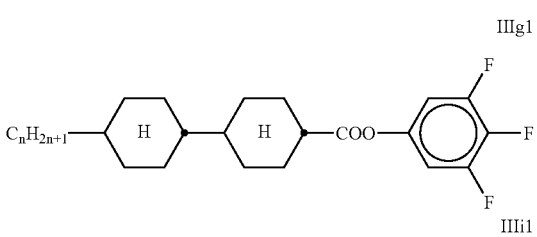

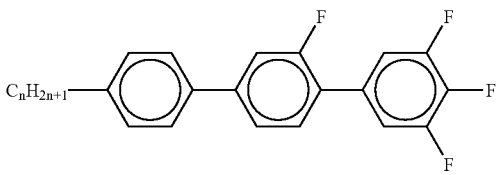

in which n is 1 to 7.

7. A nematic liquid-crystal mixture according to claim 1, further comprising at least one compound of formula IVc 1

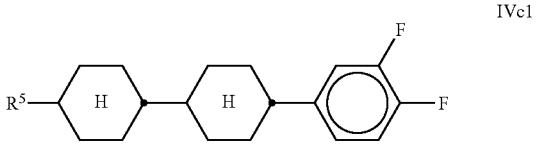

wherein $R^5$ is alkyl or alkenyl, in each case having up to 7 carbon atoms.

8. A nematic liquid-crystal mixture according to claim 1, further comprising at least one compound of formula IVh 1

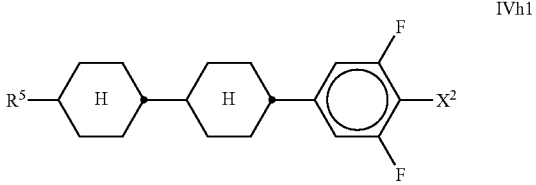

in which $R^5$ is an alkyl having up to 7 carbon atoms and $X^2$ is $CF_3$, $OCF_3$ or $OCHF_2$.

9. A nematic liquid-crystal mixture according to claim 1, further comprising at least one compound of formula V6

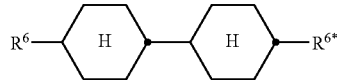
V6 wherein $R^6$ is straight-chain alkyl having 1 to 12 carbon atoms and $R^{6*}$ is straight-chain alkenyl having 2 to 12 carbon atoms.

10. A nematic liquid-crystal mixture according to claim 1, further comprising at least one compound of formula V16

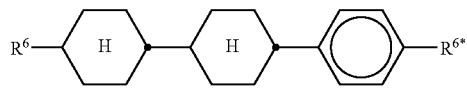
V16 wherein $R^6$ is straight-chain alkenyl having 2 to 12 carbon atoms and $R^{6*}$ is straight-chain alkyl having 1 to 12 carbon atoms.

11. A nematic liquid-crystal mixture according to claim 1, further comprising at least one compound of formula V27

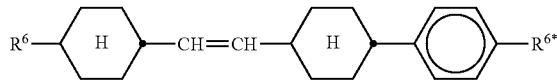
V27 wherein $R^6$ is straight-chain alkenyl having 2 to 12 carbon atoms and $R^{6*}$ is straight-chain alkyl or alkoxy having 1 to 12 carbon atoms.

12. A nematic liquid-crystal mixture according to claim 1, further comprising at least one compound of formula V32

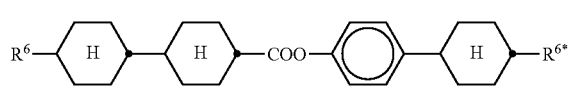
V32 wherein $R^6$ and $R^{6*}$, independently of one another, are each straight-chain alkyl having 1 to 12 carbon atoms.

13. A nematic liquid-crystal mixture according to claim 1, further comprising at least one compound of formula VIIa

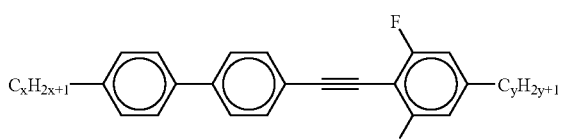
VIIa wherein x and y are each, independently of one another, 1 to 12.

14. A nematic liquid-crystal mixture according to claim 1, further comprising at least one compound of formula VIIe

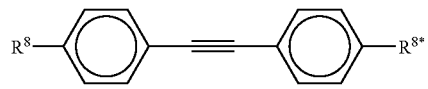
VIIe wherein $R^8$ is straight-chain alkoxy having 1 to 12 carbon atoms and $R^{8*}$ is straight-chain alkyl having 1 to 12 carbon atoms.

15. A nematic liquid-crystal mixture according to claim 1, wherein the proportion of compounds of formula I in the mixture is 1 to 40% by weight.

16. A nematic liquid-crystal mixture according to claim 1, wherein the proportion of compounds of formula I in the mixture is 3 to 30% by weight.

17. A nematic liquid-crystal mixture according to claim 1, wherein the proportion of compounds of formula I in the mixture is 5 to 20% by weight.

18. A nematic liquid-crystal mixture according to claim 1, wherein said mixture comprises
a) 20 to 99% by weight of a liquid-crystalline component A consisting of one or more compounds having a dielectric anisotropy of greater than +1.5;
b) 1 to 80% by weight of a liquid-crystalline component B consisting of one or more compounds having a dielectric anisotropy of −1.5 to +1.5; and
c) optionally an optically active component C in such an amount that the ratio between the layer thickness (separation of the outer plates) and the natural pitch of the resultant chiral nematic liquid-crystal mixture is 0.2 to 1.3; and wherein component A comprises, at least one compound of the formula I.

19. A nematic liquid-crystal mixture according to claim 18, wherein component A contains one or more cyano compounds of formulae IIa to IIk

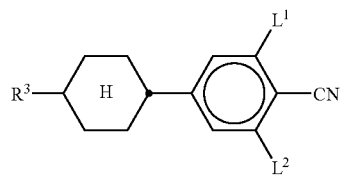
IIa

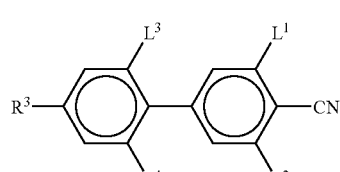
IIb

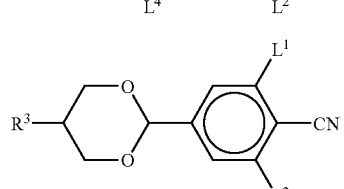
IIc

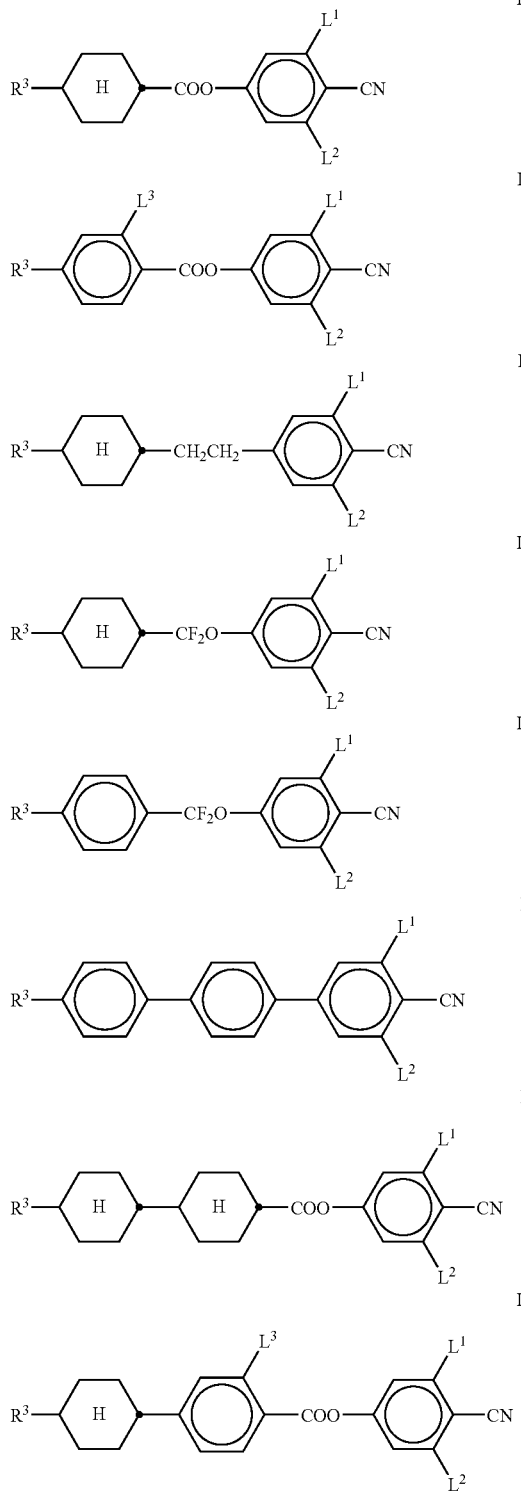

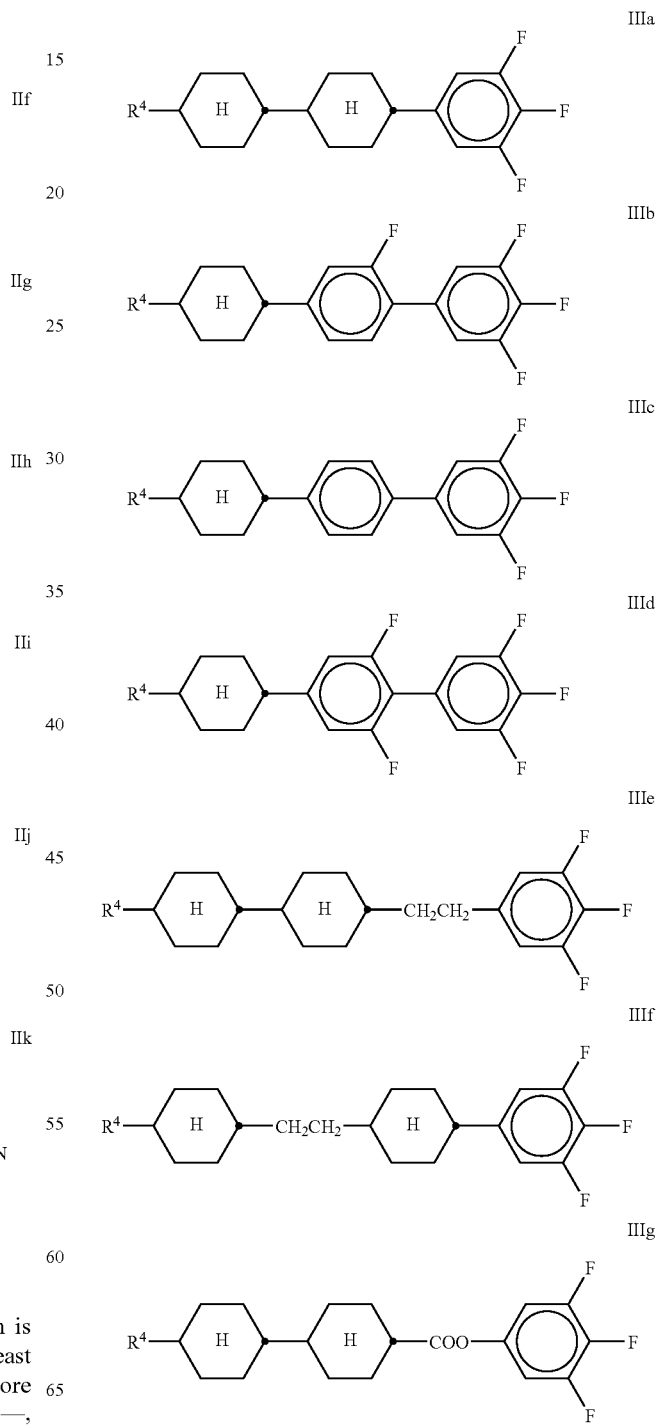

wherein
R³ is an alkyl having up to 15 carbon atoms which is unsubstituted, monosubstituted by CN or CF₃ or at least monosubstituted by halogen, and wherein one or more CH₂ groups are optionally replaced by —O—, —S—, —C≡C—, —CH=CH—, —OC—O— or —O—CO— in such a way that O atoms are not linked directly to one another, and
L¹ to L⁴ are each, independently of one another, H or F.

20. A nematic liquid-crystal mixture according to claim 19, wherein R³ is alkyl, alkenyl, alkoxy or alkenyloxy, in each case having up to 7 carbon atoms.

21. A nematic liquid-crystal mixture according to claim 18, wherein component A contains one or more 3,4,5-trifluorophenyl compounds of formulae IIIa to IIIj -continued

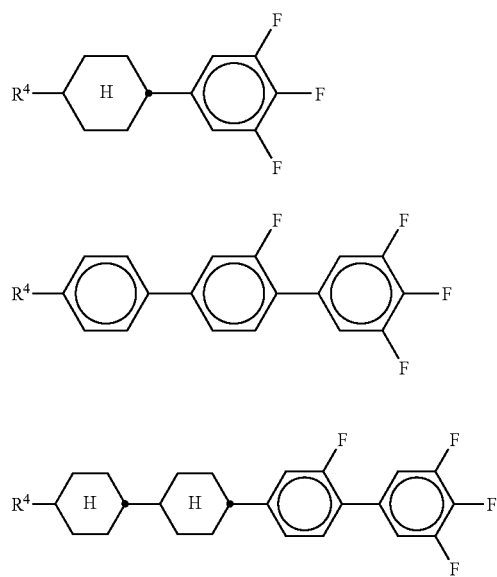

IIIh

IIIi

IIIj wherein

R⁴ is an alkyl having up to 15 carbon atoms which is unsubstituted, monosubstituted by CN or CF₃ or at least monosubstituted by halogen, and wherein one or more CH₂ groups are optionally replaced by —O—, —S—, —C≡C—, —CH=CH—, —OC—O— or —O—CO— in such a way that O atoms are not linked directly to one another.

22. A nematic liquid-crystal mixture according to claim 21, wherein component A contains one or more compounds of formulae IVa to IVm

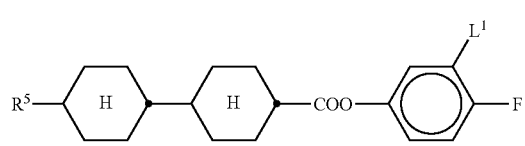

IVa

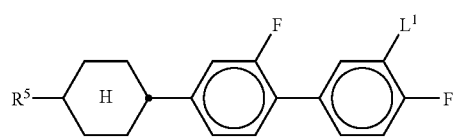

IVb

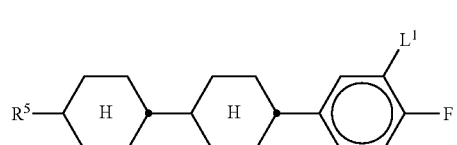

IVc

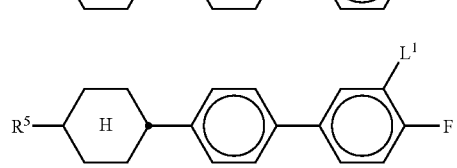

IVd

-continued

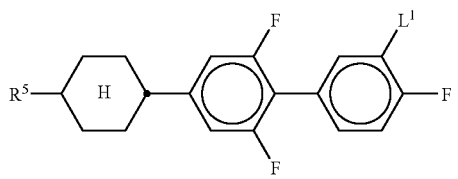

IVe

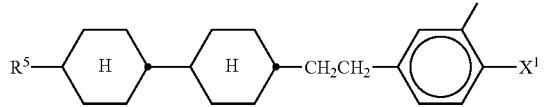

IVf

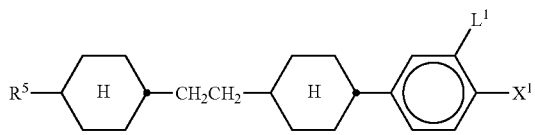

IVg

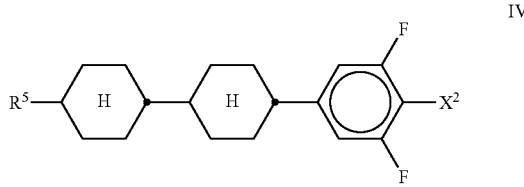

IVh

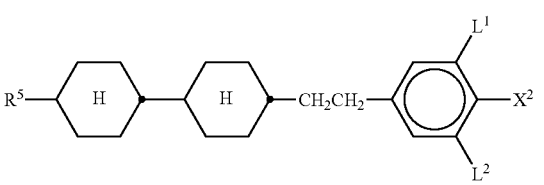

IVi

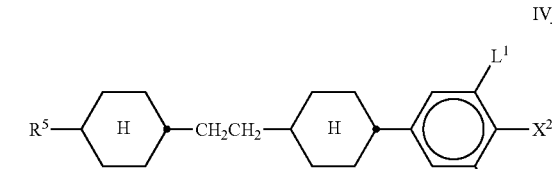

IVj

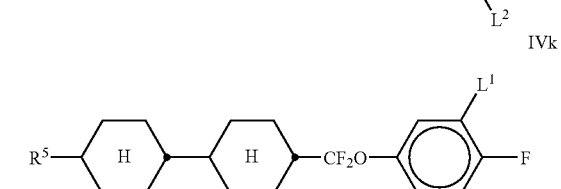

IVk

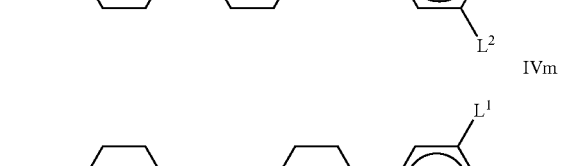

IVm wherein

R⁵ is an alkyl radical having up to 15 carbon atoms which is unsubstituted, monosubstituted by CN or CF₃ or at least monosubstituted by halogen, and wherein one or more CH$_2$ groups are optionally replaced by —O—, —S—, —C≡C—, —CH=CH—, —OC—O— or —O—CO— in such a way that O atoms are not linked directly to one another,
L$^1$ and L$^2$ are each, independently of one another, H or F,
X$^1$ is F or Cl, and
X$^2$ is CF$_3$, OCF$_3$ or OCHF$_2$.
23. A nematic liquid-crystal mixture according to claim 18, wherein component B contains one or more compounds of formulae V1 to V36
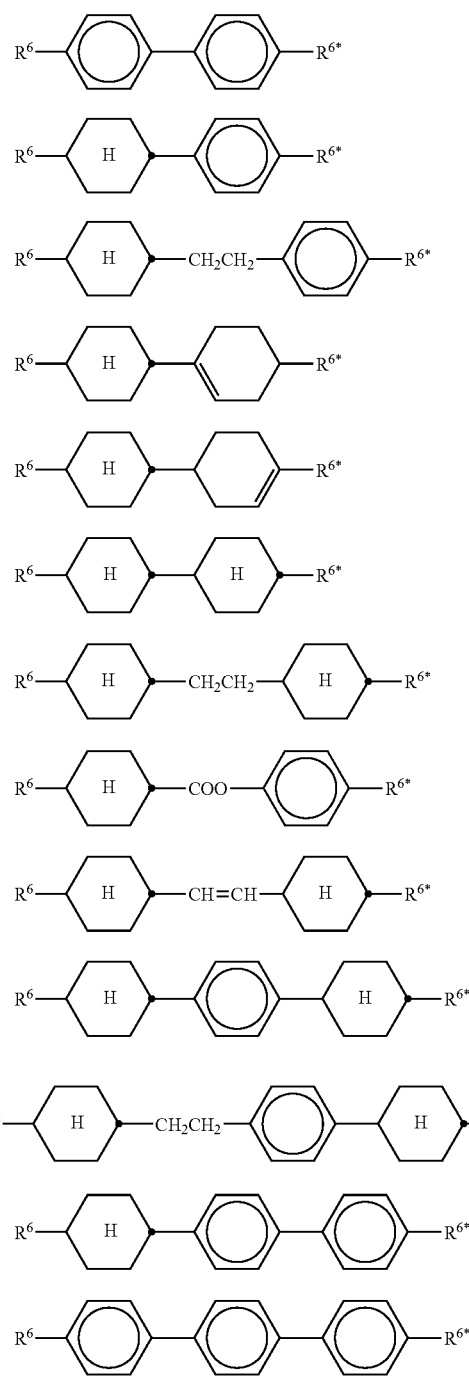
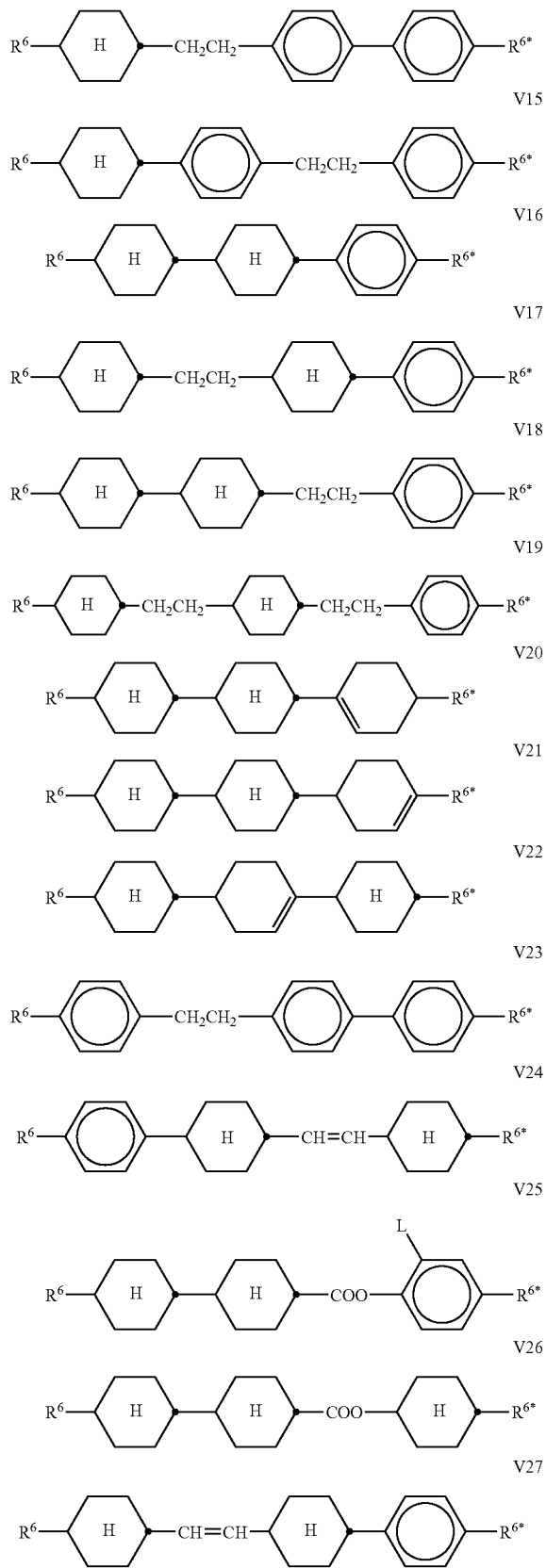

-continued

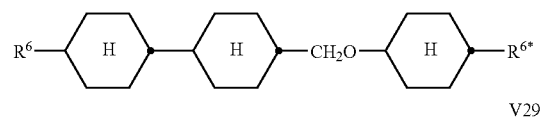
V28

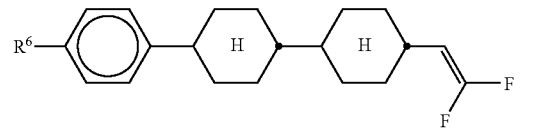
V29

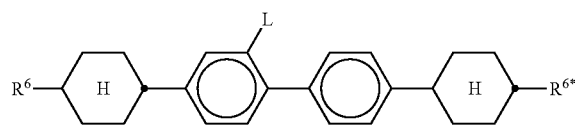
V30

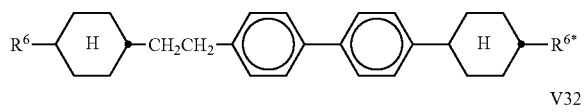
V31

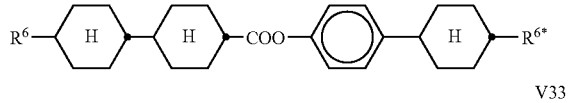
V32

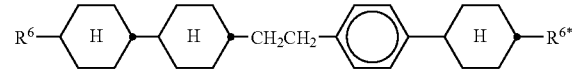
V33

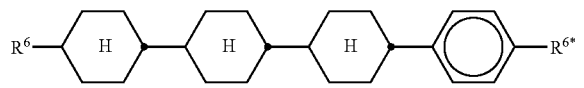
V34

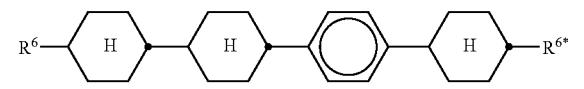
V35

-continued

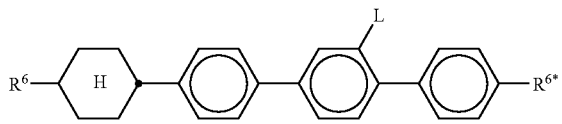
V36 wherein $R^6$ and $R^{6*}$, independently of one another, are each an alkyl having up to 15 carbon atoms which is unsubstituted, monosubstituted by CN or $CF_3$ or at least monosubstituted by halogen, and wherein in addition, one or more $CH_2$ groups in these radicals may be replaced by —O—, —S—, —C≡C—, —C=CH—, —OC—O— or —O—CO— in such a way that O atoms are not linked directly to one another, L is H or F, and the 1,4-phenylene rings are unsubstituted or monosubstituted or polysubstituted by F.

24. A nematic liquid-crystal mixture according to claim 1, wherein said mixture further comprises one or more compounds of formula VIa and/or formula VIb

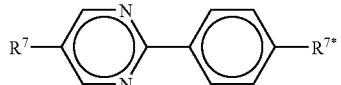
VIa

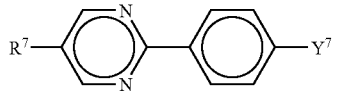
VIb wherein $R^7$ and $R^{7*}$, independently of one another, are alkyl having from 1 to 7 carbon atoms, and $Y^7$ is F or Cl.

25. A nematic liquid-crystal mixture according to claim 1, wherein said mixture further comprises one or more compounds of formulae VIIa to VIIg

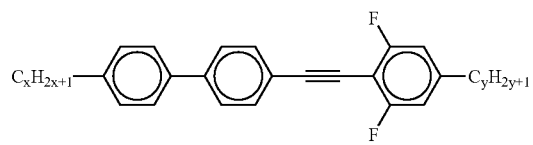
VIIa

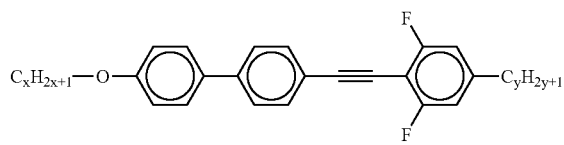
VIIb

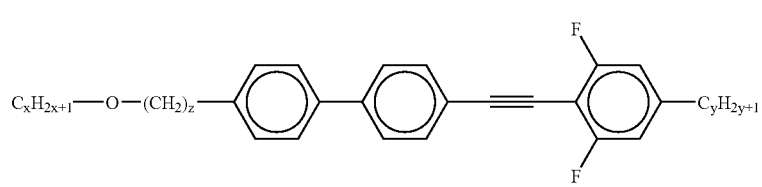
VIIc

-continued

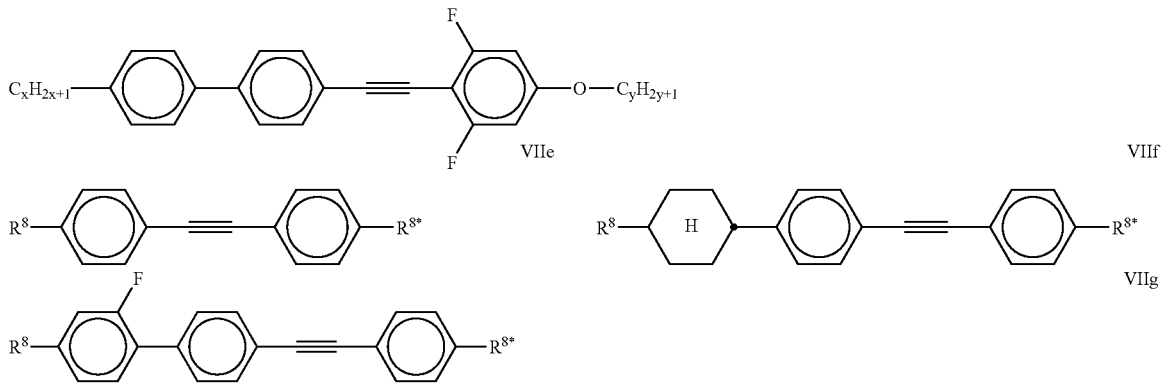

wherein
R[8] and R[8*], independently of one another, are each an alkyl having up to 15 carbon atoms which is unsubstituted, monosubstituted by CN or CF$_3$ or at least monosubstituted by halogen, and wherein one or more CH$_2$ groups are optionally replaced by —O—, —S—, —CH=CH—, —OC—O— or —O—CO— in such a way that O atoms are not linked directly to one another, x and y are each 1 to 12, where x+y≦15, and z is 1 to 5.

26. A nematic liquid-crystal mixture according to claim 1, wherein said mixture further comprises at least one compound of the formulae VIIIa to VIIIe

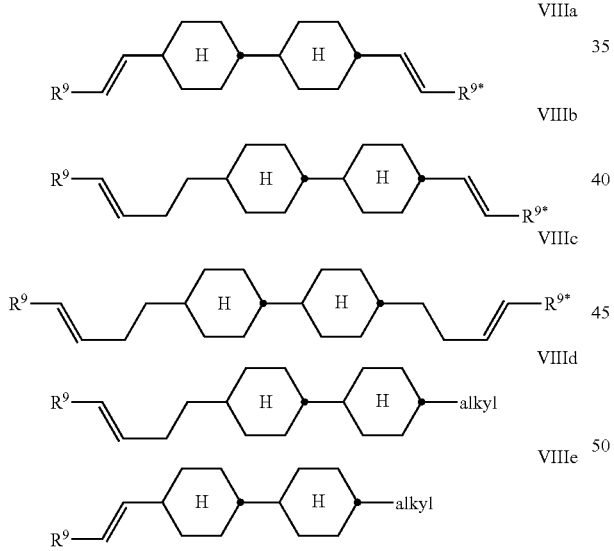

wherein
R[9] and R[9*] are each, independently of one another, H, CH$_3$, C$_2$H$_5$ or n-C$_3$H$_7$, and
"alkyl" is a straight-chain alkyl group having 1 to 7 carbon atoms.

27. TN or STN liquid-crystal display, having
two outer plates, which, together with a frame, form a cell,
a nematic liquid-crystal mixture of positive dielectric anisotropy located in said cell,
electrode layers with alignment layers on the insides of said outer plates,
a tilt angle between the longitudinal axis of the molecules at the surface of the outer plates and the outer plates of 0° to 30°, and
a twist angle of the liquid-crystal mixture in the cell from alignment layer to alignment layer with a value of 22.5° to 600°,
wherein said nematic liquid-crystal mixture comprises
a) 20 to 99% by weight of a liquid-crystalline component A consisting of one or more compounds having a dielectric anisotropy of greater than +1.5;
b) 1 to 80% by weight of a liquid-crystalline component B consisting of one or more compounds having a dielectric anisotropy of −1.5 to +1.5; and
c) optionally an optically active component C in such an amount that the ratio between the layer thickness (separation of the outer plates) and the natural pitch of the chiral nematic liquid-crystal mixture is 0.2 to 1.3; and
wherein component A comprises, at least one compound of the formula I

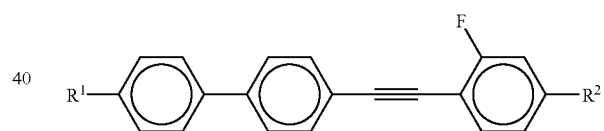

wherein
R[1] is alkyl having up to 15 carbon atoms which is unsubstituted, monosubstituted by CN or CF$_3$ or at least monosubstituted by halogen, and optionally one or more CH$_2$ groups in R[1] are each replaced by —O—, —S—, —C≡C—, —OC—O— or —O—CO— in such a way that O atoms are not linked directly to one another, and
R$_2$ is alkenyl having up to 15 carbon atoms which is unsubstituted, or monosubstituted by CN or CF$_3$ or at least monosubstituted by halogen, wherein optionally one or more CH$_2$ groups in R[2] are each replaced by —O—, —S—, —C≡C—, —OC—O— or —O—CO— in such a way that O atoms are not linked directly to one another.

28. A nematic liquid-crystal mixture according to claim 1, wherein R[2] is C$_2$–C$_7$-1E-alkenyl, C$_4$–C$_7$-3E-alkenyl, or C$_5$–C$_7$-4E-alkenyl.

29. A nematic liquid-crystal mixture according to claim 1, wherein R[2] is vinyl, 1E-propenyl, 1E-butenyl, 1E-pentenyl, 1E-hexenyl, 1E-heptenyl, 3E-butenyl, 3E-pentenyl, 3E-hexenyl, 3E-heptenyl, 4-pentenyl, 4Z-hexenyl, 4E-hexenyl, 4Z-heptenyl, 5-hexenyl, or 6-heptenyl.

30. A nematic liquid-crystal mixture according to claim 1, wherein said one or more compounds are of formula Ia

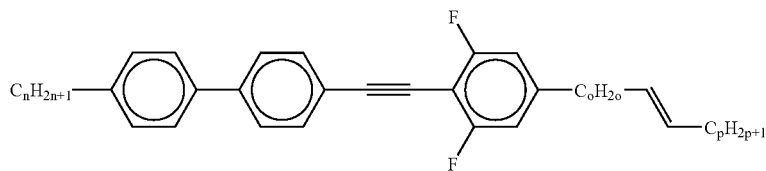

wherein
n is from 1 to 10, and
o and p are each, independently of one another, identical or different, from 0 to 5.

31. A nematic liquid-crystal mixture according to claim 1, wherein the proportion of compounds of formula I in said mixture is from 7.5 to 40% by weight.

32. A nematic liquid-crystal mixture according to claim 1, wherein the proportion of compounds of formula I in said mixture is from 7.5 to 30% by weight.

33. A nematic liquid-crystal mixture according to claim 1, wherein the proportion of compounds of formula I in said mixture is from 7.5 to 20% by weight.

* * * * *

UNITED STATES PATENT AND TRADEMARK OFFICE
CERTIFICATE OF CORRECTION

PATENT NO. : 7,052,744 B2  Page 1 of 1
APPLICATION NO. : 10/819280
DATED : May 30, 2006
INVENTOR(S) : Hirschmann et al.

It is certified that error appears in the above-identified patent and that said Letters Patent is hereby corrected as shown below:

Column 41, line 27 reads "-CH≡CH-," should read -- -C≡C-, -CH=CH-, --

Signed and Sealed this

Twenty-third Day of January, 2007

JON W. DUDAS
*Director of the United States Patent and Trademark Office*